Feb. 15, 1966 J. P. ROTH ET AL 3,235,842
SERIALLY CONNECTED INHIBITOR LOGIC STAGES WITH MEANS FOR BYPASSING A SELECTED STAGE
Filed July 29, 1960 36 Sheets-Sheet 1

INVENTORS
JOHN PAUL ROTH
JAMES H. GRIESMER
RAYMOND E. MILLER
JOHN L. SELFRIDGE
ERIC G. WAGNER
BY Thomas & Crickenberger
ATTORNEYS Feb. 15, 1966 J. P. ROTH ET AL 3,235,842

SERIALLY CONNECTED INHIBITOR LOGIC STAGES WITH MEANS FOR BYPASSING A SELECTED STAGE

Filed July 29, 1960 36 Sheets-Sheet 9

Feb. 15, 1966 J. P. ROTH ET AL 3,235,842

SERIALLY CONNECTED INHIBITOR LOGIC STAGES WITH MEANS FOR BYPASSING A SELECTED STAGE

Filed July 29, 1960 36 Sheets-Sheet 24

Feb. 15, 1966 J. P. ROTH ET AL 3,235,842

SERIALLY CONNECTED INHIBITOR LOGIC STAGES WITH MEANS FOR BYPASSING A SELECTED STAGE

Filed July 29, 1960

36 Sheets-Sheet 28

Feb. 15, 1966 J. P. ROTH ET AL 3,235,842

SERIALLY CONNECTED INHIBITOR LOGIC STAGES WITH MEANS FOR BYPASSING A SELECTED STAGE

Filed July 29, 1960 36 Sheets-Sheet 34

United States Patent Office 3,235,842
Patented Feb. 15, 1966

3,235,842

SERIALLY CONNECTED INHIBITOR LOGIC STAGES WITH MEANS FOR BYPASSING A SELECTED STAGE

John Paul Roth and James H. Griesmer, Ossining, Raymond E. Miller, Yorktown Heights, John L. Selfridge, Briarcliff Manor, and Eric G. Wagner, New York, N.Y., assignors to International Business Machines Corporation, New York, N.Y., a corporation of New York Filed July 29, 1960, Ser. No. 46,263
4 Claims. (Cl. 340—147)

The present invention relates to inhibitor logic systems, and more particularly to means for preventing the occurrence of errors caused by defective components in such systems, and to means for detecting the presence of defective components.

In equipment designed to process data through certain logical operations many component parts such as AND circuits, OR circuits, flip-flops and the like are employed in the construction. A convenient way of expressing the logical operation of such circuits is in terms of Boolean functions. In order to utilize these Boolean functions in accordance with the invention they must be stated in disjunctive normal form. This means that the function is expressed as a disjunction of terms, each term of which is a conjunction of variables on their negations. In this form no variable can occur twice in any term. For example the function $$f_1(a_1, a_2, a_3)=a_1a_2 \vee a_2\bar{a}_3$$

is in normal form, while the functions $$f_2(a_1, a_2, a_3)=a_1(a_2 \vee \bar{a}_3)$$

and $$f_3(a_1, a_2, a_3)=a_1a_2 \vee a_1a_3\bar{a}_3$$

are not. In order to have a complete expression it is necessary to have both the function and the negation of the function expressed in disjunctive normal form. When both the function and the negation of the function are expressed in disjunctive form, then the complete expression thus obtained is called the "supernormal form." It is this "supernormal" form that is used in constructing inhibitor logic circuitry. Such inhibitor logic circuitry can be utilized to synthesize component circuits in rectangular array form. These arrays are synthesized from the supernormal form of mathematical expressions defined as polynomial functions in terms of a plurality of variables as explained in detail in the copending application of Raymond E. Miller et al. entitled Inhibitor Logic Arrays, Serial No. 18,692 filed on March 30, 1960 now Patent Number 3,175,197 and assigned to the assignee of the present application. An array of conductive wires is assembled with one set of wires corresponding to the variables in the function and the other set of wires corresponding to the terms in the function. At selected intersections or crossover points of the sets of wires in the rectangular array thus constructed, inhibitor elements are disposed in accordance with the particular functions being synthesized. When the array is then selectively energized in accordance with the values of the variables, the inhibitor elements serve to indicate the function value by inhibiting certain lines in the array to produce an output along a desired output line. The rectangular array configuration is particularly desirable because of the ease with which it lends itself to test and correction procedures.

A convenient way of constructing the rectangular array circuits is by vapor deposition or printed circuit techniques. If the construction technique employed is that of vapor deposition, the conductive lines are sputtered upon a dielectric plate or substrate such as glass. A high degree of miniaturization is possible with this process, and it is not uncommon to have the conductive lines spaced as closely as one thousand lines per inch. It will be appreciated that when such close tolerances are observed, the very nature of the sputtering process will result in some open or short-circuit conditions existing among the deposited conductors. The problem then arises of detecting and correcting these manufacturing defects before the rectangular array can be put into operation as well as those defects which occur subsequent to manufacture.

When thin film conductors, such as those produced by vapor deposition techniques, are employed in cryogenic devices operating at very low temperatures additional problems result. The plates on which the arrays are deposited are submerged in liquefied gas refrigerant baths to effect the desired operating temperatures. The extreme temperature change caused by the immersion of the array circuitry into the particular refrigerant employed sets up stresses in the conductive lines which can cause them to separate and produce open and short-circuit conditions. Once an array has been submerged in the refrigerant, it is desirable not to remove the array for repair, since the removal and reinsertion, in turn, can cause additional errors other than the original defects and force a loss of system operation time. A feature of the present invention is the provision of a system for detecting defective components in an array while the array is submerged in the refrigerant, and allowing the repair of the defective component to take place without removal of the array.

Because of the complexity of the system in most cryogenic data handling devices and the fact that the components are relatively inaccessible when submerged in the refrigerant, it is very desirable to have a highly reliable system requiring little or no repair necessitating access to components in the refrigerant bath. One feature of the present invention is the provision of redundant components arranged in the active circuitry to override failures in certain ones of the circuit components without causing failure of the circuit operation. Majority circuits may be included among the redundant components to average a plurality of binary inputs and furnish a plurality of outputs which are identical to each other and conform to the binary value expressed by the majority of the inputs. These majority circuits are effective to eliminate errors even in the absence of error detection equipment, since the correction is automatic and there is no need for detection.

The requirements for miniaturization dictate that the rectangular array circuitry be arranged on the dielectric plates with a minimum of waste space. A further feature of the invention is the staging or arrangement of the array circuitry such that maximum utilization is made of the plate area. This is accomplished by arranging the stages in close-packed configurations.

In the event that the circuitry becomes defective after having been placed in the refrigerant bath, it then becomes necessary to locate the defective component and replace it without removing the circuitry from the bath. A still further feature of the invention is the provision of a method for backward checking the stages of the system first to locate the defective stage, and then locate the defective component in that stage. In conjunction with the method of backward checking, unique bias and bypass arrangements for the circuitry are provided. These bias and bypass arrangements enable the checking of individual stages by simulating the correct input to any given stage.

In one arrangement according to this invention these features are realized in a data handling system which includes a plurality of rectangular array inhibitor devices for the performance of logical and storage operations. The arrays are arranged in stages on plates according to either a diagonal or close-packed configuration. Maximal paths for data flow are determined to insure the most efficient utilization of the physical plate area. Either bypass or bias circuits are associated with each array. The bias and bypass circuits can be controlled to simulate any desired output for a given stage, and in this manner the input to the succeding stage can be set up for test purposes. The final stage may be checked by forcing the inputs to this stage through a given sequence and observing the outputs. This procedure is repeated backwardly through the stages until a defective stage is located. When a defective stage is found, the individual wires in the stage are checked until the defective one is located. A procedure is outlined for locating all defects when a bypass arrangement is associated with each function array. The defective component is then replaced with a spare and the checking continues until all the stages are free of defects. In addition to providing means for the detection and correction of errors, the system may be made substantially free of errors by the employment of redundant stages and majority circuits which are located between stages to correct for minority errors.

These and other features of the invention will be understood more readily by making reference to the following specification and to the drawings in which:

FIGS. 1*a* and 1*b* are illustrations of an inhibitor element and an equivalent cryotron device, respectively;

FIGS. 2*a* through *c* make up a step-by-step illustration of how an inhibitor array is synthesized;

FIG. 3 is an illustration of a plate showing diagonal staging;

FIGS. 4*a* and 4*b* are illustrations of plates employing close-packed staging;

FIGS. 5*a* and 5*b* are illustrations of plates with the maximal paths outlined;

Figure 10A:
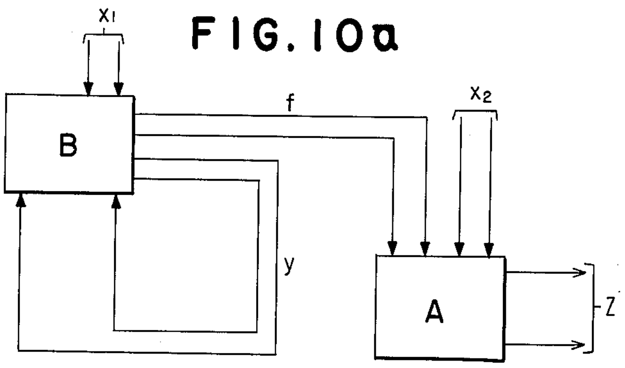
Figure 10B:
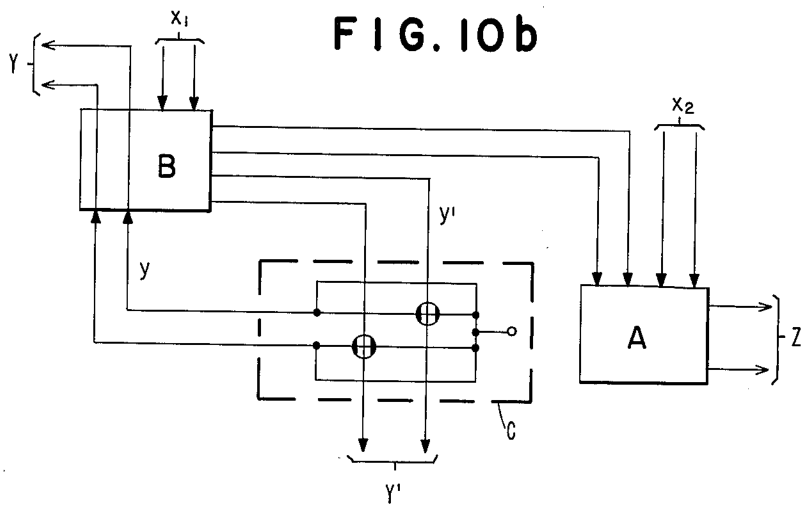
Figure 10C:
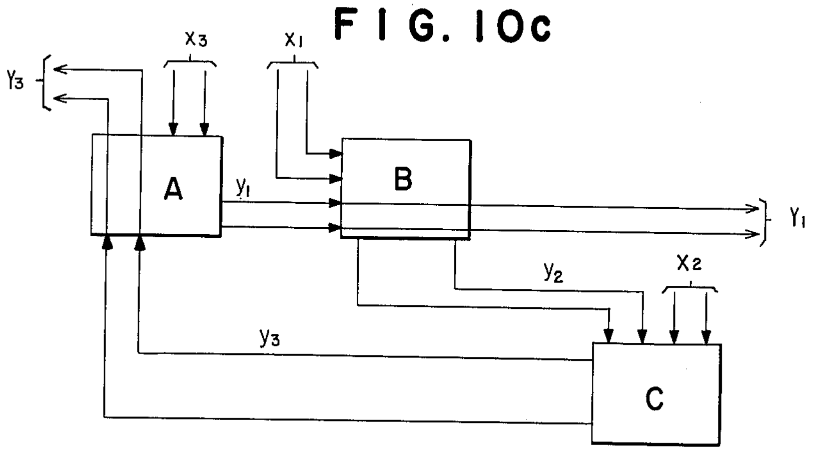
Figure 11:
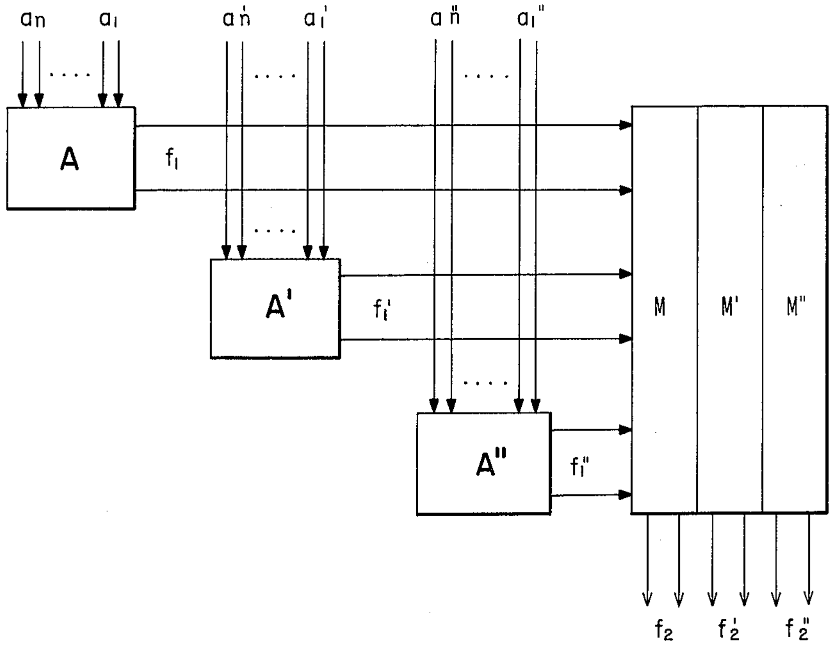
Figure 12:
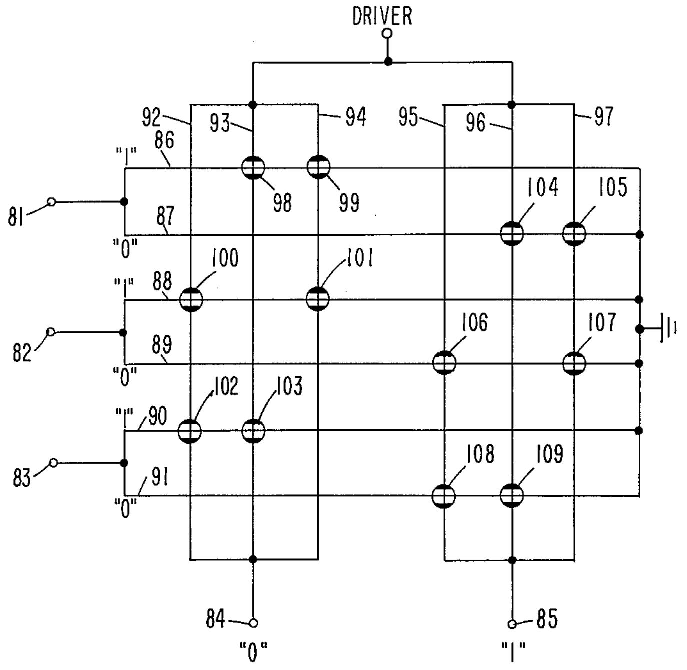
Figure 13:
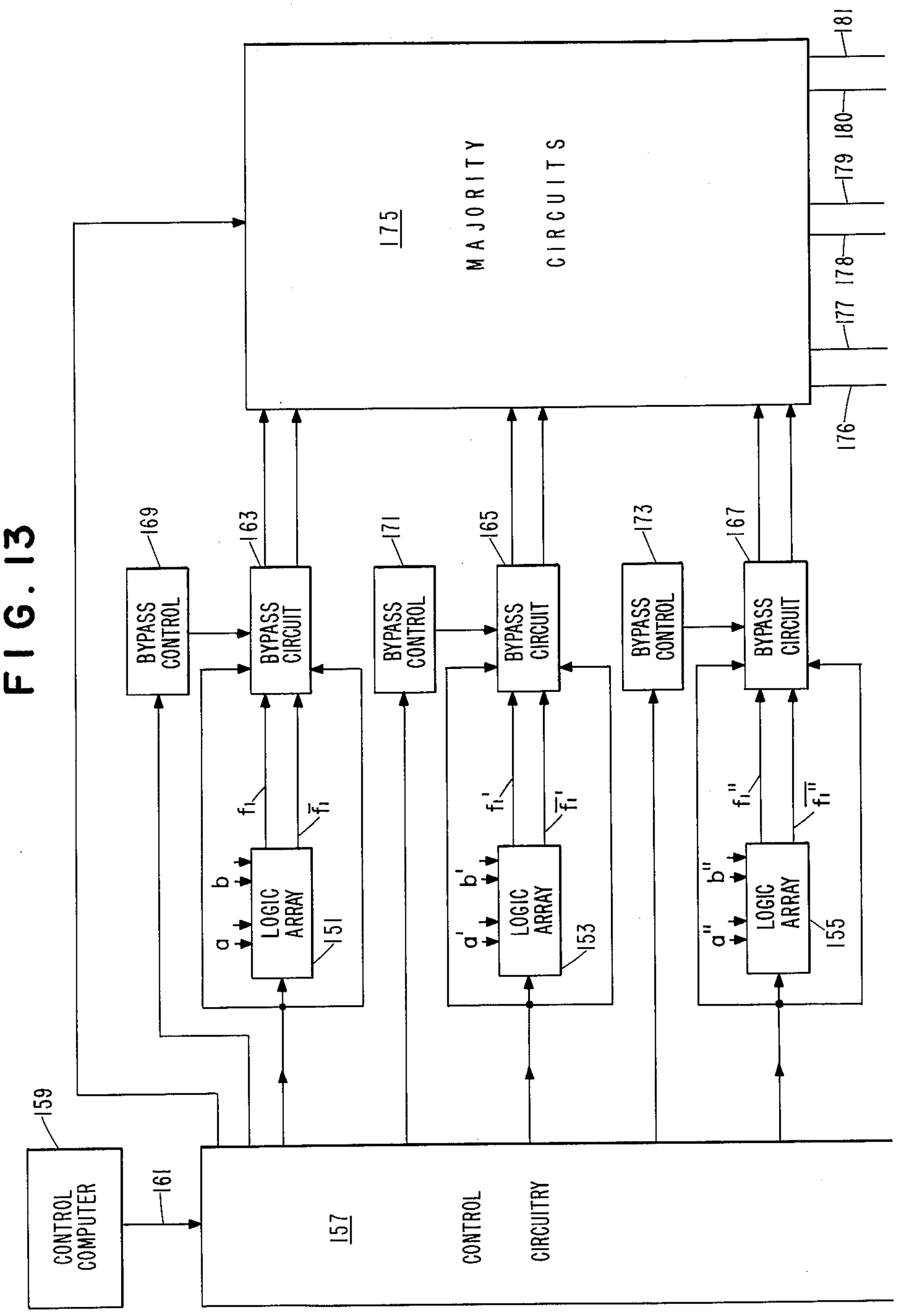
Figure 14:
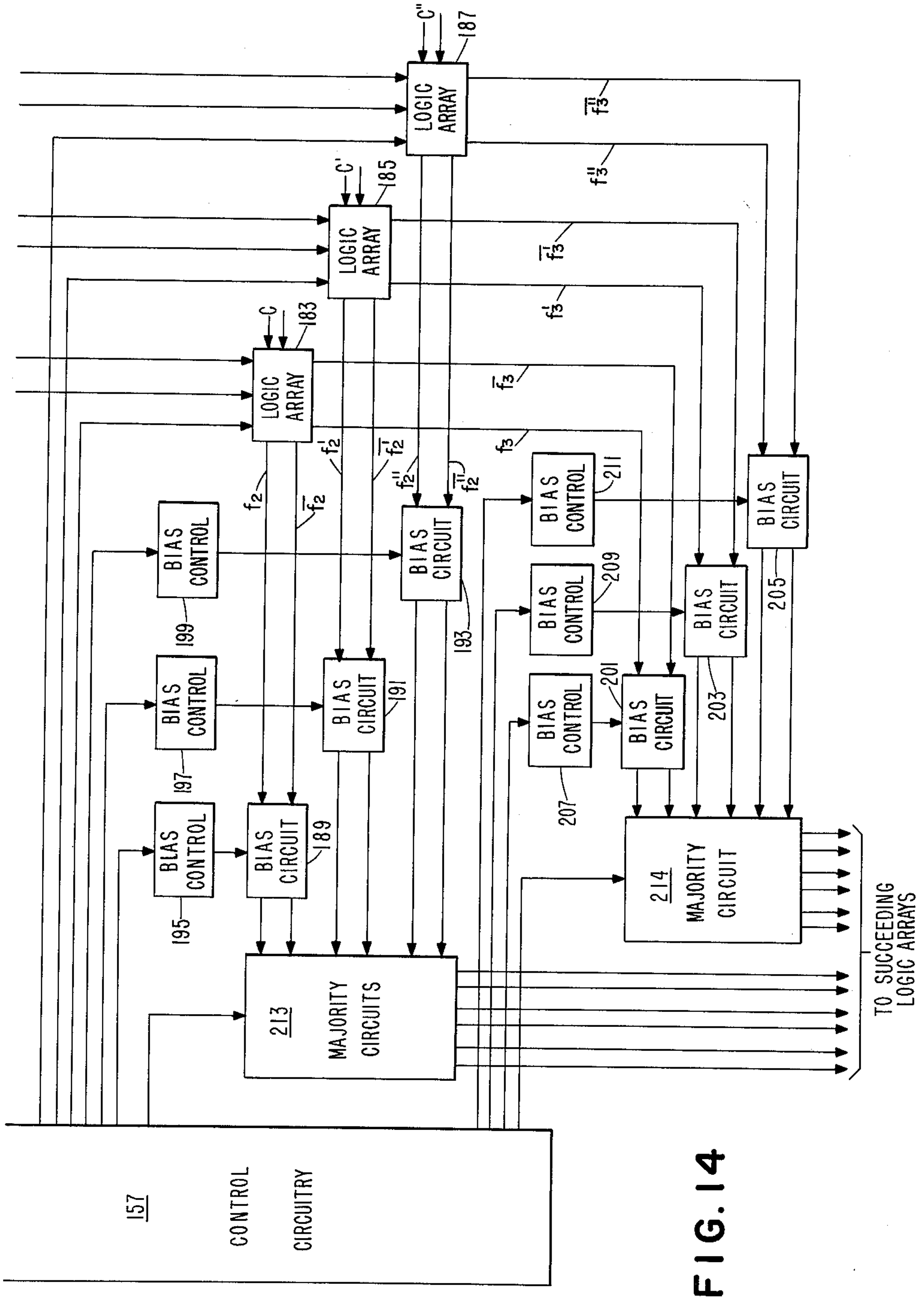
Figures 42, 43:
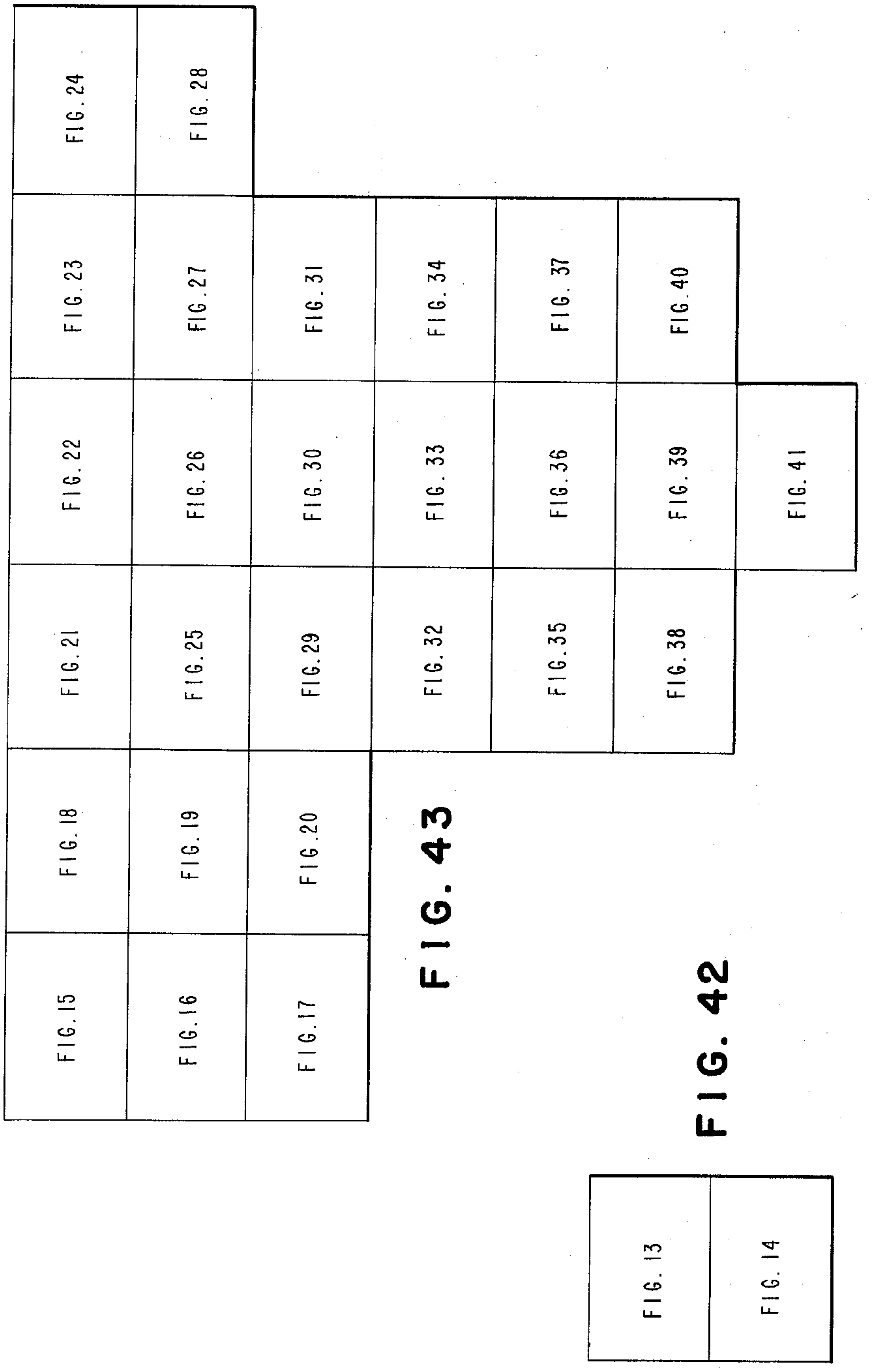

FIGS. 10*a* through *c* are illustrations of checking operations on non-series staging having feedback;

FIG. 11 is a block diagram showing redundant logic stages and majority circuits;

FIG. 12 is an illustration of a rectangular array majority circuit;

FIGS. 13 and 14 are a block diagram illustration of a portion of a data handling system embodiying the principles of the present invention;

FIGS. 15 through 41 are detailed illustrations of the circuits shown in FIGS. 13 and 14;

FIG. 42 is a diagram showing the way in which FIGS. 13 and 14 are to be placed; and FIG. 43 is a diagram showing the way in which FIGS. 15 to 41 are to be placed.

Figure 1A:
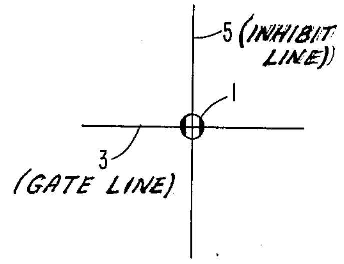

Referring now to drawings, FIG. 1*a* illustrates a basic inhibitor element 1. The inhibitor element 1 has a pair of conductive lines 3 and 5 passing therethrough. The inhibitor 1 is located at the crossover or intersection point of these two lines. The lines are not conductively connected at the point of intersection, but the physical spacing is such that the electromagnetic field in one of these lines, when a current exists, will act upon the other line. In the arrangement shown, a signal on line 5 will inhibit a signal from appearing on line 3. If there is a signal on line 3, then this signal will remain until line 3 is inhibited by a signal appearing on line 5. The particular form of the inhibitor in the illustration has no physical significance and is used as a logic symbol only.

Figure 1B:
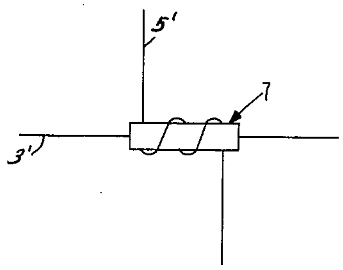

FIG. 1*b* shows a cryotron device which may be employed as the inhibitor element 1 of FIG. 1*a*. Cryotron 7 has a control winding 5′ and a gate line 3′. The gate line of the cryotron is constructed of a material which is in a super-conductive state at the operating temperature of the cryotron in the absence of a magnetic field.

The gate line is driven resistive (non-superconducting or normal condtion) by a magnetic field produced when a current greater than a predetermined minimum exists in its control winding 5′. Thus, the cryotron utilizes the fact that the superconductive transition of the material depends upon both temperature and the applied electromagnetic field. The inherent characteristics of such a device enable it to perform switching and inhibiting functions which are readily adaptable to computer applications.

The cryotron 7 may be constructed of any suitable material having the required operating characteristics. The gate line must have the property of transferring from its superconductive to its normal state under the influence of a magnetic field, and the material tin has been found satisfactory for this application. The control winding 5′ and the connections between the various components of associated circuitry (not shown) must be fabricated from a superconductive material which remains in its superconductive state under all conditions of circuit operation. An example of such a material is lead. The construction of the cryotron, together with the types of materials employed, may be understood more readily by referring to the article by Dudley A. Buck, "The Cryotron—A Superconductive Computer Component," Proceedings of the IRE, pages 482 to 493, April 1956.

The use of inhibitor logic is particularly applicable to cryogenic circuits, and, therefore, the cryotron has been suggested as a suitable inhibitor device because the cryotron is a basic superconductive element. It will be understood, however, that other equivalent devices may be used as the inhibitor elements in the circuits constructed in accordance with the present invention.

Figure 2A:
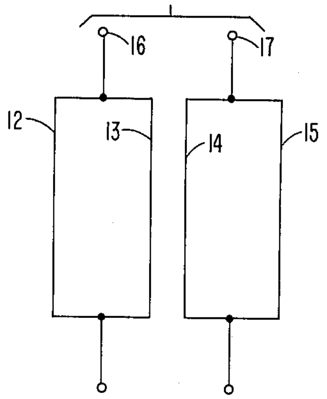

In order to synthesize rectangular array circuitry to conform to mathematical functions, it will be necessary to assume that any variable, as well as the function value itself, may be indicated by current in one of two wires. Two such pairs of wires are shown in FIG. 2*a* of the drawing and are denoted by the numerals 12, 13 and 14, 15. In accordance with the principles of this invention these pairs of wires are superconductors, and currents initiating at terminals 16 and 17 may exist in either wire of the wire pairs but not in both wires of a pair simultaneosuly. This is accomplished by controlling the conductivity of these wires by control inhibitor elements placed in either branch of the pair. The control inhibitor elements have been omitted from FIG. 2*a* through *c* in order to simplify the illustration.

Figure 2B:
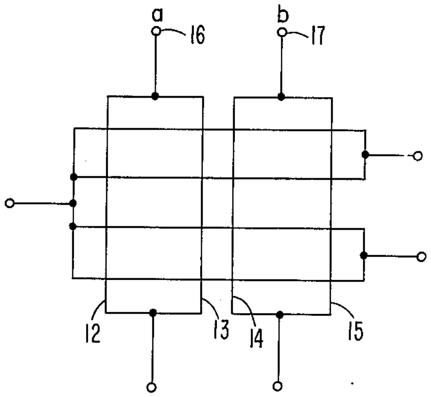
Figure 2C:
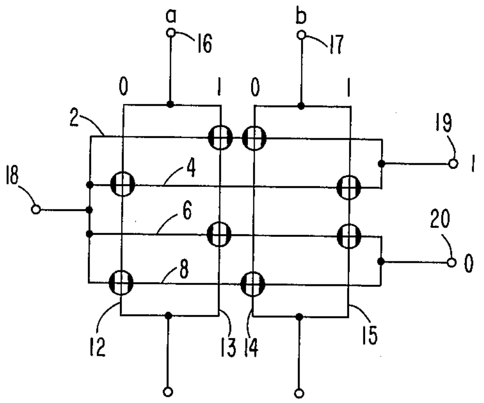

In order to illustrate more clearly the manner in which a circuit may be synthesized, FIGS. 2*a* through *c* illustrate the synthesis of an "exclusive OR" logical operation. The supernormal form expression for this logic in Boolean terminology is $f=\bar{a}b \vee a\bar{b}$ and $\bar{f}=\bar{a}\bar{b} \vee ab$. The circuitry would be synthesized as follows:

(1) Provide two pairs of lines, one pair for each of the variables *a* and *b*;

(2) Cross the two pairs of lines with four single wires, one for each of the terms $\bar{a}b$, $a\bar{b}$, $\bar{a}\bar{b}$ and $ab$;

(3) Connect together all of the single wires on the left side and provide a terminal 18 to be connected to a driver current source;

(4) Connect together the lines for the terms $\bar{a}b$ and $a\bar{b}$ on the right side to provide a common output terminal 19 representing the "1" state of the function *f*. Connect together the lines representing the terms $\bar{a}\bar{b}$ and $ab$ to a common terminal 20 to serve as the "0" state indication of the function *f*.

(5) Along the line for $\bar{a}b$ place an inhibitor where this line crosses the "1" side of input *a* and also where the line crosses the "0" side of input *b*. This will produce an output along the line $\bar{a}b$ when the input *a* is conducting on the "0" side and the input *b* is conducting on the "1" side. Similarly, along the line $a\bar{b}$ place inhibitors where this line crosses the "0" side of input *a*, and the "1" side of input $b$. Place inhibitors along the line $\overline{ab}$ where this line crosses the "1" side of input $a$ and the "1" side of input $b$. Place inhibitors along the line $ab$ where this line crosses the "0" side of input $a$ and the "0" side of $b$.

It will be seen from this array that an output will be produced on the "1" side at terminal 19 when either $a$ is "0" and $b$ is "1" or when $a$ is "1" and $b$ is "0." A "0" output will be obtained when the inputs $a$ and $b$ are either both "0" or both "1." Thus, the circuit in fact realizes an exclusive OR function.

In similar fashion this procedure is applicable whenever a function $f$ and its negation $\bar{f}$ are represented in minimum supernormal form. The use of the minimum supernormal form representations for $f$ and $\bar{f}$ will insure that the least number of inhibitors is used in the construction. Also, the minimum supernormal form representation admits readily to test and correction procedures. Thus, the rectangular array circuits expressed from minimum supernormal form representations are adaptable to both an automatic method for logical construction and for test and correction procedures.

It has been illustrated how a single stage of supernormal form circuitry might be synthesized, but mathematical requirements and the problems of physical construction often dictate that the circuit exist in a plurality of stages. Assume that for $n$ inputs $a_1 \ldots a_n$, it is desired to construct a multiple output combinational circuit to realize as final outputs $z_1 \ldots z_m$. Intermediate stages of circuitry must be provided between the inputs and outputs to conform to such desired criteria as speed and complexity. Although the circuitry could be realized in a single stage of minimum supernormal form circuitry if functional output requirements alone were considered, in many cases a circuit with fewer elements can be obtained by using multiple stages. The general problem of staging can be approached by using Boolean tree algorithms as defined in the article by J. Paul Roth, "Minimization Over Boolean Trees," IBM Journal of Research and Development, volume 4, Number 5, pages 543–558, November 1960, and the combinational circuit mentioned above may be staged as follows:

(0) $a_1 \ldots a_n$ are initial inputs
(1) $b_1 \ldots b_p$ are functions of $a_1 \ldots a_n$
(2) $c_1 \ldots c_q$ are functions of $b_1 \ldots b_p$
(3) $d_1 \ldots d_r$ are functions of $c_1 \ldots c_q$

. . . . . . . . . . .
. . . . . . . . . . . .

($k$) $z_1 \ldots z_m$ are functions of $y_1 \ldots y_t$

This staging is physically realized by expressing the $b$'s in minimum supernormal form as functions of the $a$'s, the $c$'s as functions of the $b$'s, the $d$'s as functions of the $c$'s . . . and the $z$'s as functions of the $y$'s.

From the circuit shown in FIG. 2c it will be apparent that the stages must follow a right angle pattern, since the outputs from any section of logic leave at right angles to the inputs, and these outputs are then used as inputs to the next stage. If it is assumed that the plate carrying the rectangular array circuitry is partitioned into squares and that each stage of logic is put into a single square, the array pattern may take on either a diagonal form or a close-packed form.

Figure 3:
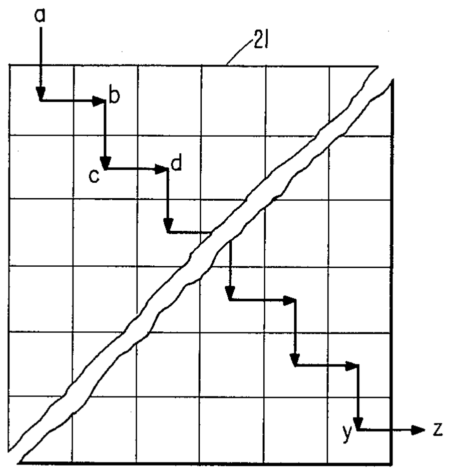

FIG. 3 is an illustration of a diagonal staging pattern. The plate 21 is shown as being laid off in any desired number of square units, each of which may contain a complete rectangular array stage. The input $a$ to the first stage produces an output $b$ which serves as the input to the second stage. The input $b$ to the second stage produces an output $c$ which serves as the input to the third stage producing an output $d$, and so on until the input to the final stage $y$ produces the final output $z$. It will be appreciated that many squares on the plate are not utilized by the actual circuitry expressing the logic; however, there is often times a great deal of error detection and correction circuitry associated with the basic logic circuitry, and the diagonal form of staging may be preferred when there is a large amount of associated circuitry to be accommodated.

Figure 4A:
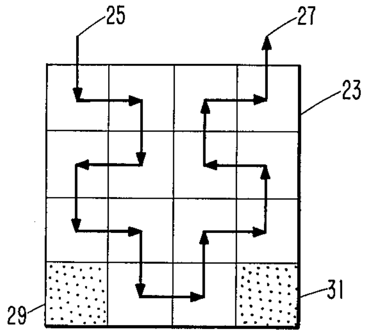

FIGS. 4a and b illustrate examples of close-packed staging. The object of this type of staging is to realize the maximum utility of the physical space available on a plate. In doing this, the plate is divided up into a number of squares each of which is large enough to contain an array. For example, the plate 23 of FIG. 4a has sixteen squares (four divisions per side) and the plate 33 of FIG. 4b has twenty-five squares (five divisions per side). Certain conditons must be observed in arranging the stages on a plate. First, both ends of the path must be on the edges of the plate, but no part of the path may be external to the plate. If the path enters one edge of a square and leaves an adjacent edge, then this square cannot contain any other part of the path and the square is said to be covered by the path. However, if the path enters one edge of a square and leaves the opposite edge, then the path may later pass through this square by using two edges not used by the first part of the path. Such squares are said to be missed by the path, as are all squares not entered by the path. In close-packed staging the desired path misses a minimum number of squares on the board and is called a maximal path.

In FIG. 4a the path enters plate 23 at 25 and traces through the configuration of squares entering one edge of a square and leaving an adjacent edge of a square to emerge at point 27. In this instance two squares, 29 and 31, were missed.

Figure 4B:
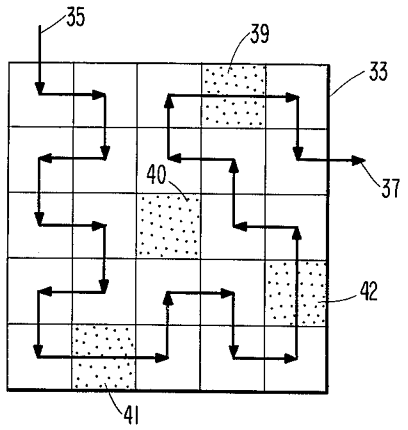

In FIG. 4b the path enters plate 33 at point 35 and traces through the configuration of squares missing squares 39 to 42. The path emerges at point 37. Of the four squares missed, only one was not touched by the path. Squares 39, 41 and 42 were passed over by the path, but the criterion of entering and leaving adjacent edges was not met so these squares were not covered.

Figure 5A:
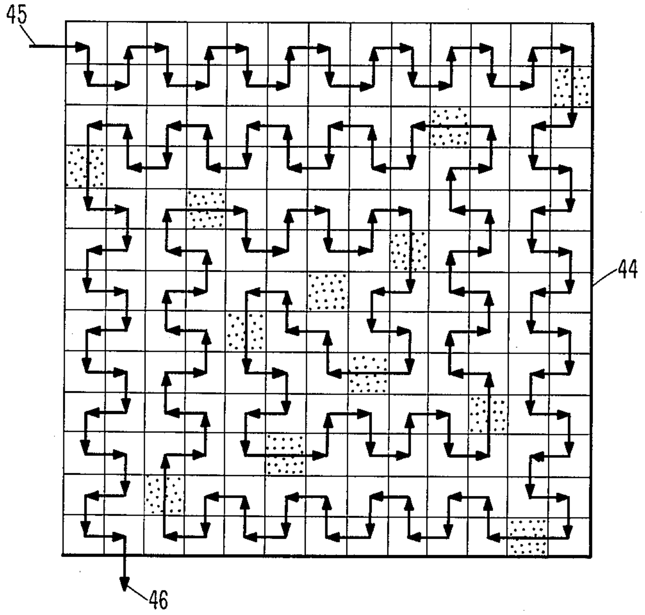

FIGS. 5a and b depict an algorithm which misses only $n-1$ squares for odd values of $n$ and $n-2$ squares for even values of $n$, where $n$ is the number of units along the side of a square. In FIG. 5a $n$ equals 13, and there are twelve squares missed by the path which enters plate 44 at 45 and leaves the plate at 46. The missed squares are shown as containing dots.

Figure 5B:
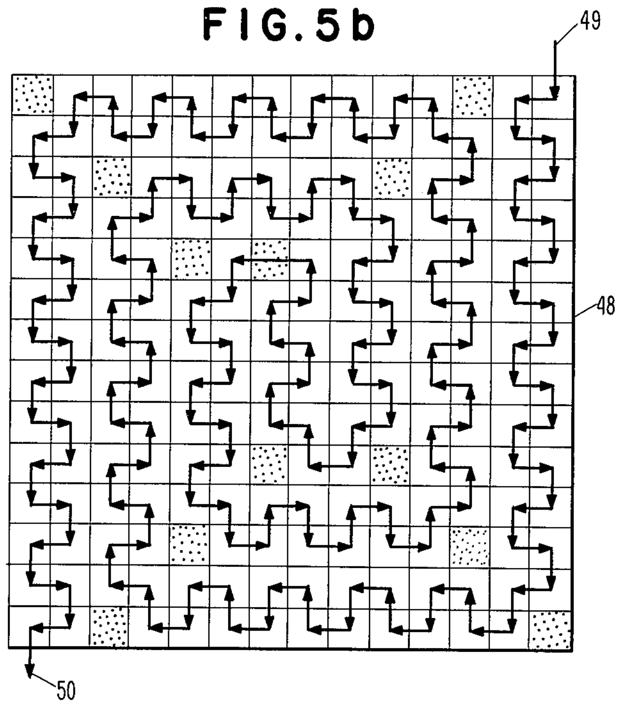

In FIG. 5b the path enters plate 48 at 49 and leaves at 50. In this case $n$ equals 14 and there are twelve squares missed. Here again, the missed squares are shown by dots. It will be noted that in the case of both FIG. 5a and FIG. 5b the paths are made up of a series of L-shaped segments which wind from the outside of the square toward the center for half of the path and then unwind from the center toward the outside for the second half of the path.

Figure 6:
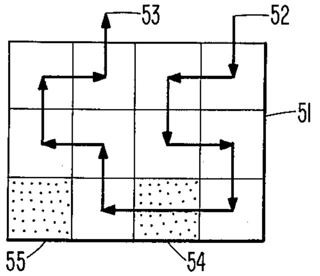
FIG. 6 is another illustration of a plate with the maximal path outlined.

FIG. 6 illustrates a maximal path on a rectangular plate having $m$ rows and $n$ columns of squares. Each segment of the path, except the terminal segments, joins the centers of a pair of covered squares, horizontally or vertically. A terminal segment reaches the center of just one covered square. If the row length is odd, each row has an uncovered square or contains a terminal segment. There are three cases to be considered dependent upon the values of $m$ and $n$.

In the first case if $m$ is even and $n$ is odd then a maximal path misses $m-2$ squares and has horizontal terminal segments. Conversely, if $m$ is odd and $n$ is even then a maximal path misses $n-2$ squares and has vertical terminal segments.

The second case is when $m$ and $n$ are even with $m$ being equal to or less than $n$. In this situation a maximal path misses $m-2$ squares and has parallel (horizontal when $m$ is less than $n$) terminal segments.

The third case is when $m$ and $n$ are odd with $m$ being less than $n$. In this case a maximal path misses $n-2$ squares and has vertical terminal segments. If $m$ is equal to $n$, then a maximal path misses $n-1$ squares and has perpendicular terminal segments.

In summary, the number of squares not covered by a maximal path in a rectangle is two less than the number of units along the shorter side if this number is even; otherwise, it is two less than the length of the longer side, or one less if the lengths are odd and equal. Thus the narrower the rectangle, the more important it is to keep the number of units along the shorter side even. The relationships are expressed in Table I below.

*Table I*

| | $m=n$ | | $m<n$ | |
|---|---|---|---|---|
| | $m$ even | $m$ odd | $m$ even | $m$ odd |
| Number of squares missed; Positions of terminal segments. | $m-2$ parallel | $m-1$ perpendicular | $m-2$ horizontal | $n-2$ vertical |

When rectangular array inhibitor circuitry has been laid out in minimum supernormal form, the problems of checking and correcting errors may be handled with certainty. It is necessary to assume that control is maintained over the initial inputs and that the final outputs can be observed. Also, unless elsewhere specified it will be assumed that the staging is done in series fashion, and that each stage has spares available to duplicate any wire switching arrangements to switch the spares in and out.

The defects which might be present are short and open circuit conditions and defective cryotrons. To insure reliability, it is necessary to detect and eliminate any such defects. The effect of a short-circuit to ground will be discussed in connection with FIG. 2c which represents the function $f=\bar{a}b\vee a\bar{b}$. For purposes of the discussion assume that a short-circuit to ground occurs on the "1" side of the "$a$" variable pair between the inhibitors. If the input is $a=1$, $b=0$, current will flow on the "1" side of the "$a$" variable pair to the short-circuit ground between the inhibitors. Function wire 2 will be inhibited, but because no current flows through the inhibitor at the crossing of function wire 6, wire 6 will not be inhibited. Current entering from terminal 18 will split into wires 4 and 6, and it is impossible to specify which output (if any) would be produced. If the input is $a=0$, $b=0$, wires 2, 4 and 8 will be inhibited. However, the current on the "0" side of the "$a$" variable pair would have a choke coil to pass through at the bend formed by the meeting of conductors 12 and 13. Current in line 12 would tend to back up and flow through line 13 to the short-circuit ground. Wire 2 would then be inhibited, and it would be impossible to specify what output could be expected. It is clear, therefore, that a short-circuit to ground must be detected and eliminated if the system is to function reliably.

It was stated previously that most of the defects which produce short or open circuit conditions occur during the manufacturing process or during the submersion of the array in the refrigerant bath. A simple short-circuit test which can be performed on the manufactured plates prior to insertion in the bath consists of an ohmmeter check at the various external connections between the loops which conduct the working currents to detect any short-circuits to ground. If a short-circuit is detected, the plate is rejected and the testing process continues on other plates.

Once the plate has been submerged in the refrigerant bath, the testing for open or short-circuit conditions involves two procedures which are performed alternately on first the variable wires and then the function wires. These testing procedures are based upon a method of backward checking. This simply means that the last or final stage is tested first, and then each preceding stage is tested in turn until the entire system has been checked.

Figure 7:
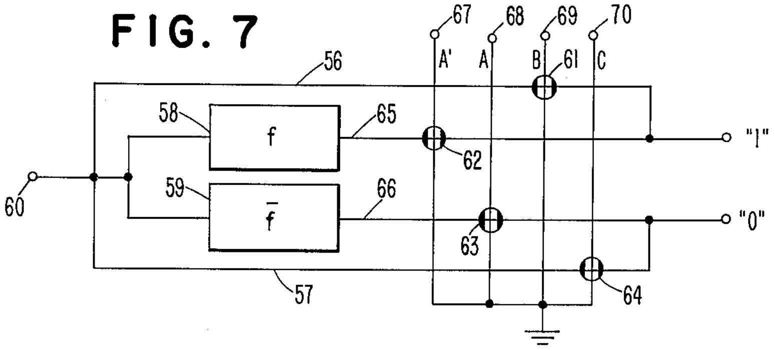
FIG. 7 is an illustration of a bypass circuit.

Thus, test information always passes through stages which have been tested and corrected, thereby insuring the accuracy of the test procedure. A convenient way of isolating a given stage from any errors which have occurred in previous stages is realized by the use of bypass or bias circuitry. FIG. 7 illustrates a bypass circuit arrangement, and FIG. 8 illustrates a bias circuit arrangement.

In FIG. 7 bypass lines 56 and 57 are provided to short out the function array 58 and the negation of the function array 59. Thus, alternate paths are provided from the terminal 60 to the output "1" terminal and to the output "0" terminal. Output line 65 from array 58 may be inhibited by a current applied at terminal 67 to activate inhibitor 62. Output line 66 from array 59 may be inhibited by a current applied at terminal 68 to activate inhibitor 63. Bypass line 56 may be inhibited by applying a current at terminal 69 to activate inhibitor 61, and bypass line 57 may be inhibited by applying a current to terminal 70 to activate inhibitor 64. In ordinary operation of the arrays 58 and 59, currents are present at terminals 69 and 70 inhibiting bypass lines 56 and 57. Usually, there are no currents at terminals 67 and 68, and output lines 65 and 66 are not inhibited. When it is desired to force the output at the "1" and "0" terminals to some value other than that presented along lines 65 and 66, this may be accomplished by the proper sequence of current at terminals 67 to 70. Thus, it will be seen that the bypass circuitry described is effective in the method of backward checking to supply any desired input to a given stage.

Figure 8:
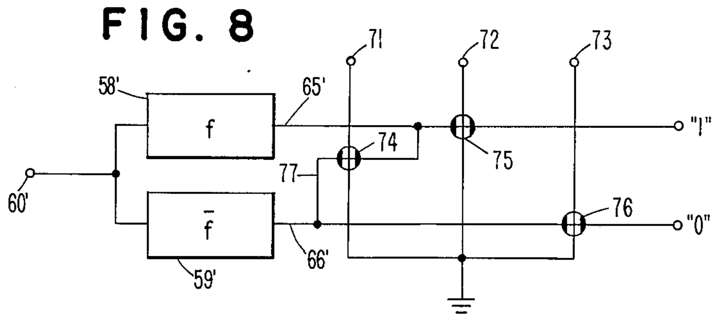
FIG. 8 is an illustration of a bias circuit.

FIG. 8 shows a complete biasing system for a function array. In this construction a bias line 77 is provided to interconnect output lines 65′ and 66′. Inhibitors 74 to 76, under the control of currents applied at terminals 71 to 73, are used to force any desired output regardless of the output presented along lines 65′ and 66′. For normal operation, a current is applied at terminals 71 causing inhibitor 74 to inhibit line 77. No currents are applied to terminals 72 and 73 and output lines 65′ and 66′ are unaffected. When it is desired to force a "1" output, a current is applied to terminal 73 activating inhibitor 76 and diverting any current which might exist in line 66′ to the "1" output terminal through line 77. Terminals 71 and 72 have no applied currents when a "1" output is being forced. When it is desired to force a "0" output, a current is applied to terminal 72 causing inhibitor 75 to inhibit line 65′ and divert any current in this line through line 77 to the "0" output terminal. Terminals 71 and 73 have no applied currents during this operation. It will be appreciated from this description that the bias circuit of FIG. 8 performs substantially the same function as the bypass arrangement of FIG. 7.

Figure 9:
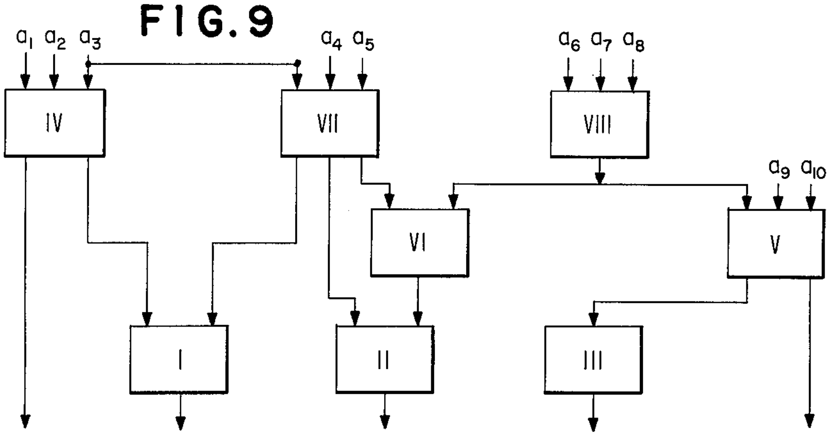
FIG. 9 is a block diagram showing non-series staging.

The preceding discussion of backward checking was applied to the case of series staging. However, it can be applied equally well to the case of non-series staging in which initial inputs can enter the circuit at any stage, and where the outputs can be independent. FIG. 9 is a block diagram of a non-series stage structure having no feedback.

Since there is no feedback in the circuit, there exists one or more stages whose outputs are final outputs and do not feed other stages. These stages are called final stages. The final stages are checked first by controlling their inputs with bypass or bias circuits in the manner discussed previously. In FIG. 9 stages I, II, and III are final stages and are checked first. The checking is accomplished by controlling the bypass wires on the stages whose outputs are inputs to the final stage being tested, and by observing the resulting outputs of the final stage being tested. Assuming that the final stages I, II and III have been tested and corrected, a revised crcuit may be considered with all the stages removed. This revised circuit will have final stages of its own, in this instance stages IV, V and VI. Stages IV, V and VI may now be checked, using controlled inputs, by observing the outputs which are either direct outputs of the stage or else are functional outputs through some final stage of the original circuits. After all final stages of the revised circuit have been tested and corrected, the circuit may again be revised, and the process repeated until all stages have been tested. This procedure can be applied to any type of staging provided there is no feedback. The only resatriction on the design is that every function be constructed as a supernormal array so that checking of the individual wires of each function may be accomplished.

When a combinational circuit with several outputs where the functions for the outputs are given in terms of the inputs must be realized, a problem is presented as to how to form the stages of circuitry between the inputs and outputs which will conform to other design criteria such as speed and simplicity. The design could be accomplished in a single stage of supernormal form circuitry if no requirements other than the functional output requirements were of importance. In many cases, however, a circuit with fewer elements will be obtained by using more than one stage of circuitry. The total line length and number of crossings may also be reduced, such that the speed might be increased by using several stages. If the circuit size per stage is limited, then the problem of representing the functions in stages can be approached by Boolean tree algorithms. In this instance the primitive functions would consist of stages no larger than the specified limited size, and the number of stages in the longest path from input to output could also be limited to give control on the circuit speed.

FIG. 10*a* illustrates a non-series staged circuit in which feedback is employed. Several difficulties are encountered in checking a circuit such as this. Stage A produces the only output $z$ of the circuit as a function of input variable $x_2$ and function $f$ from stage B. Stage A can be checked by exercising suitable control of inputs $f$ and $x_2$. Stage B produces two functions, $f$ and $y$, as functions of $x_1$ and $y$. By controlling the inputs $x_1$ and $y$ to the stage, the function wires for the circuit producing $f$ may be checked. Controlling the $y$ input, however, must be done by using the bypass wires (not shown) on the circuit in stage B which forms $y$. Thus, the circuitry to form the function $y$ cannot be checked. Furthermore, $y$ can affect the output $z$ only through the circuit producing $f$, and thus the value formed by the $y$ function at the output terminals cannot be detected while the $y$ bypass wires are being used to control the $y$ input to stage B.

FIG. 10*b* is a modified version of the circuit shown in FIG. 10*a*. Stage C, an identity circuit (the controls on the bypass wires have not been shown), and two new outputs Y and Y′ have been added. With these modifications is is possible to utilize a checking procedure. The circuit can now be considered to be like a non-feedback circuit. Stages A and C can be checked by observing the $z$ and Y outputs respectively. Stage B can then be checked by observing Y′ to check $y'$ and by observing $z$ to check $f$. Note that the Y output cannot be used to check the $y'$ circuit since $y$, and therefore, Y, are being controlled through the bypasses in stage C at the time when stage B is being checked.

A simple open circuit check of the $y'$ bypasses and Y′ output wires can be made, and similarly for the $y$ bypasses and Y output. The checked Y′ output wires then act as checked input wires for stage C, and the checked Y output wires acts as checked input wires for stage B.

The feedback loop illustrated in FIG. 10*b* is confined to a single stage. In many instances, a feedback loop will pass through several stages of circuitry. When a feedback loop passes through several stages, no extra stages such as the identity circuit in stage C of FIG. 10*b* have to be added. However, two additional outputs are required. FIG. 10*c* illustrates a circuit in which a feedback loop passes through two additional stages. The $Y_1$ and $Y_3$ outputs have been added for checking purposes. It will be noted that the stages may be checked in the order C, B, A or C, A, B. In general, more stages could be added between stage B and stage C in which case testing would be done on stage C followed by the stage preceding stage C, etc.

In addition to errors caused by short and open circuit conditions, the possibility exists that certain ones of the inhibitor elements may fail to function. In this case the inhibitor would not go resistive under the control of a crossing current and the logical function may fail to operate as desired. A convenient way of overriding such inhibitor failures is by providing more than one copy of the logic function to be realized. These copies are arranged to act in parallel so that the failure of one will be overcome by the correct operation of at least one of the others. Alternatively, rather than furnish a duplicate copy of the entire function it may sometimes be desirable to merely duplicate certain components within the array. It is pointed out here that errors which occur from open or short circuits on the wires are not corrected by redundancy.

FIG. 11 is a block diagram of a portion of a system in which the principle of redundancy has been applied to increase the reliability of the system. In this system triplicate stages A, A′ and A″ have been provided to feed in parallel three majority stages denoted as M, M′ and M″. Each of the logic stages has separate copies of the input A variable and provides a separate output function $f_1$, $f_1'$ and $f_1''$. The $f_1$ outputs of the logic stages A are preliminary outputs which are examined by a set of majority circuits M which produce the final outputs $f_2$. If a single error occurs in any of the A stages, it is corrected in the majority circuits. If a single error occurs in one level of the majority circuits, it is corrected in the following level of majority circuits. Certain multiple errors can be corrected in either the logic stages A or the majority circuits M, but an increase in the amount of redundancy is necessary before all double errors can be corrected.

FIG. 12 is a detailed illustration of one of the majority circuits M shown in block form in FIG. 11. Using corresponding notation to that used in FIG. 11, output $f_1$ appears on input lines 86 and 87, output $f_1'$ appears on lines 88 and 89, and output $f_1''$ appears on lines 90 and 91. The output terminals 84 and 85 correspond to the $f_2$ output of majority circuit M in FIG. 11. First, assume that the current signals received at terminals 81 to 83 are all diverted in the "1" lines 86, 88 and 90, thus indicating that all three inputs are the same. Current in line 86 activates inhibitors 98 and 99 to inhibit lines 93 and 94. Current in line 88 activates inhibitors 100 and 101 to inhibit lines 92 and 94. Current in line 90 activates inhibitors 102 and 103 to inhibit lines 92 and 93. Thus, each of lines 92, 93 and 94 has been inhibited at least once and current from the driver terminal will be diverted from the "0" side to the "1" side which is not inhibited at all. Therefore, the output of the majority circuit will appear at terminal 85 as a "1."

Assume now that an error occurs causing the input to terminal 83 to switch from a "1" to a "0" thereby blocking current in line 90 and causing a current in line 91. When this occurs inhibitors 102 and 103 are no longer active to inhibit lines 92 and 93, respectively. This will not affect the circuit output, however, since lines 92 and 93 are already inhibited by inhibitors 100 and 98, respectively. The current on line 91 activates inhibitors 108 and 109 causing lines 95 and 96 to be inhibited. However, line 97 is still superconductive and provides the only path from the driver terminal to terminal 85, the "1" output terminal. Therefore, it will be seen that an error to input terminal 83 causing it to switch from line 90 to line 91 will not affect the output of the majority circuit.

Assume now that a second error occurs causing the input to terminal 82 to switch from a "1" to a "0." The input pattern to the majority circuit would then have currents appearing on lines 86, 89 and 91. When this input pattern obtains, the only inhibitors in the zero function array which are activated are inhibitors 98 and 99. Inhibitors 98 and 99 inhibit lines 93 and 94, respectively, but line 92 is not inhibited thereby leaving a superconductive path from the driver terminal to terminal 84 at the "0" output. Current in line 89 activates inhibitors 106 and 107 inhibiting line 95 and 97, respectively. Current in line 91 activates inhibitors 108 and 109 inhibiting current in lines 95 and 96, respectively. Since each of lines 95, 96 and 97 is now blocked, the only superconductive path from the driver terminal to the output is along line 92, and the output of the majority circuit then switches from a "1" at terminal 85 to a "0" at terminal 84. It will be appreciated from this explanation that the majority circuit serves to give an indication of a value equal to the majority of the input values to the array.

To illustrate more clearly the principles which have been discussed separately, a portion of a data handling system in which these principles have been incorporated will now be described. Referring to FIGS. 13 and 14, which are placed together as shown in FIG. 42 to depict a block diagram of a portion of such a system, the numerals 151, 153 and 155 are used to designated rectangular array inhibitor logic circuits in which the variables *a* and *b* are combined in a logical operation. Arrays 153 and 155 are copies of the array 151 and are used to increase the reliability in accordance with the principle of redundancy previously explained. Each of the arrays 151, 153 and 155 is controlled by rectangular array control circuitry indicated generally by the numeral 157. The circuitry 157 is activated by signals from a control computer 159 along line 161 which is a diagrammatic showing of the interconnecting leads. The details of the control circuitry are disclosed in the copending applications of James H. Griesmer et al. entitled Error Correction Device, Serial No. 18,601 filed March 30, 1960 now Patent Number 3,170,071 and of Raymond E. Miller et al. entitled Error Correction Device, Serial No. 46,264 filed July 29, 1960, now Patent Number 3,135,946 both of which applications are assigned to the assignee of the present application.

Each of the logic arrays 151, 153 and 155 is provided with a bypass circuit indicated by the numbers 163, 165 and 167, respectively. Each of the bypass circuits 163, 165 and 167 is operated by a bypass control circuit indicated by the numerals 169, 171 and 173, respectively.

The outputs from the bypass circuits 163, 165 and 167 are fed into majority circuits indicated generally by the numeral 175. These majority circuits serve to give outputs along lines 176 through 181, which are associated in pairs, equal to each other and identical to the value of the majority of the input signals. By means of the majority circuits the inputs to logic arrays 183, 185 and 187 are identical, and any single error in the inputs to the majority circuits is overcome. Additionally, certain errors can be tolerated within the majority circuits themselves without affecting the operation. Bias circuits 189, 191 and 193 are provided in series with the outputs of logic arrays 183, 185 and 187. These bias circuits act under control of bias control circuits 195, 197 and 199 to aid in the backward checking of the system, and perform substantially the same function as bypass circuits 163, 165 and 167. Since the logic arrays 183, 185 and 187 realize two functions, a second group of outputs are fed into bias circuits 201, 203 and 205 which have associated bias control circuits 207, 209 and 211, respectively.

The two groups of outputs from logic arrays 183, 185 and 187 are fed into second and third groups of majority circuits indicated generally by the numerals 213 and 214. The outputs of majority circuits 213 are identical and represent the majority value of the inputs. Similarly, majority circuits 214 produce identical outputs representative of the majority value of the input functions. It will be appreciated that the diagram of FIGS. 13 and 14 represents only a section of a data handling system, and that the system may be continued indefinitely in accordance with a desired purpose with the basic principles set forth being applied to effect a highly reliable system.

Figure 15:
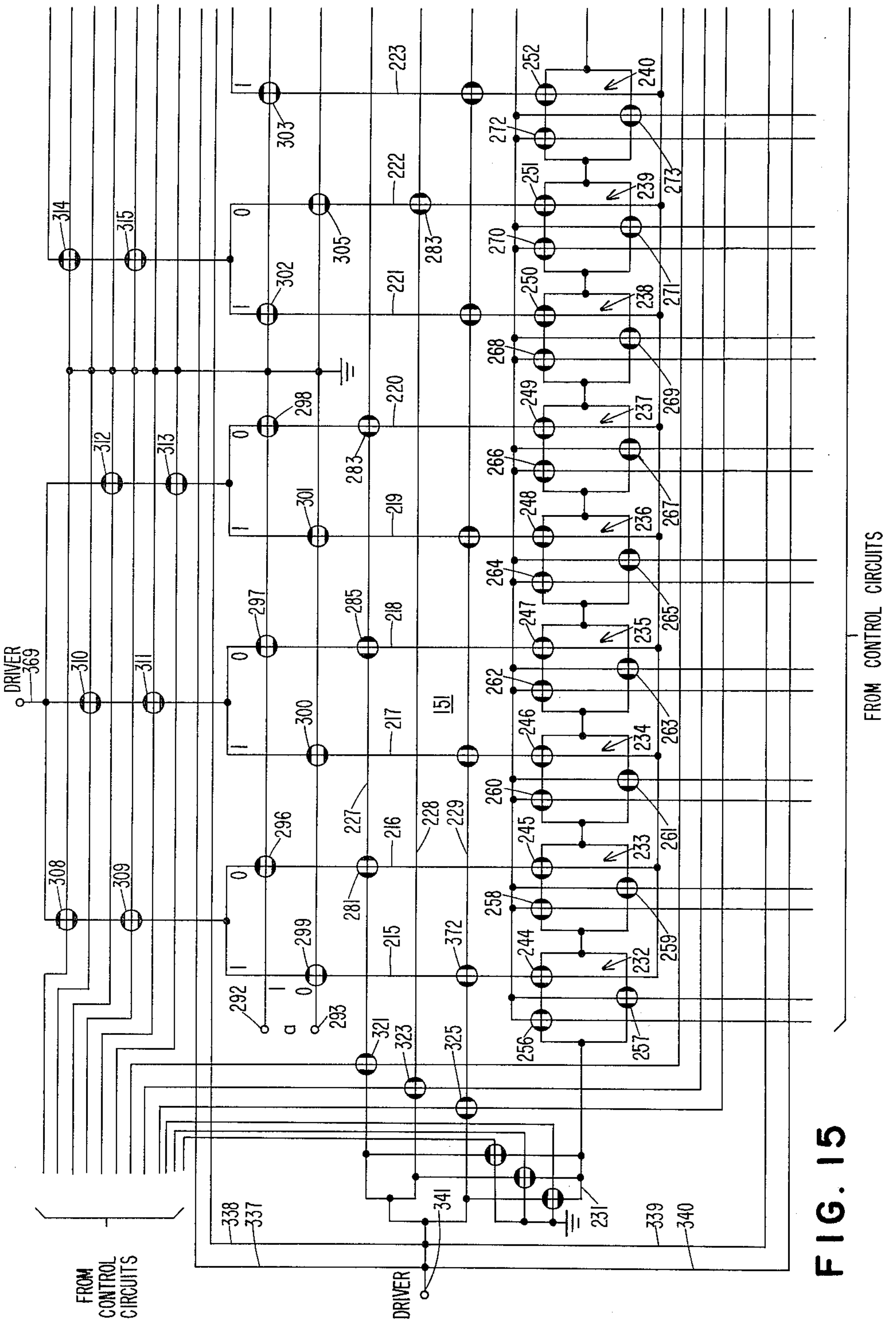
Figure 16:
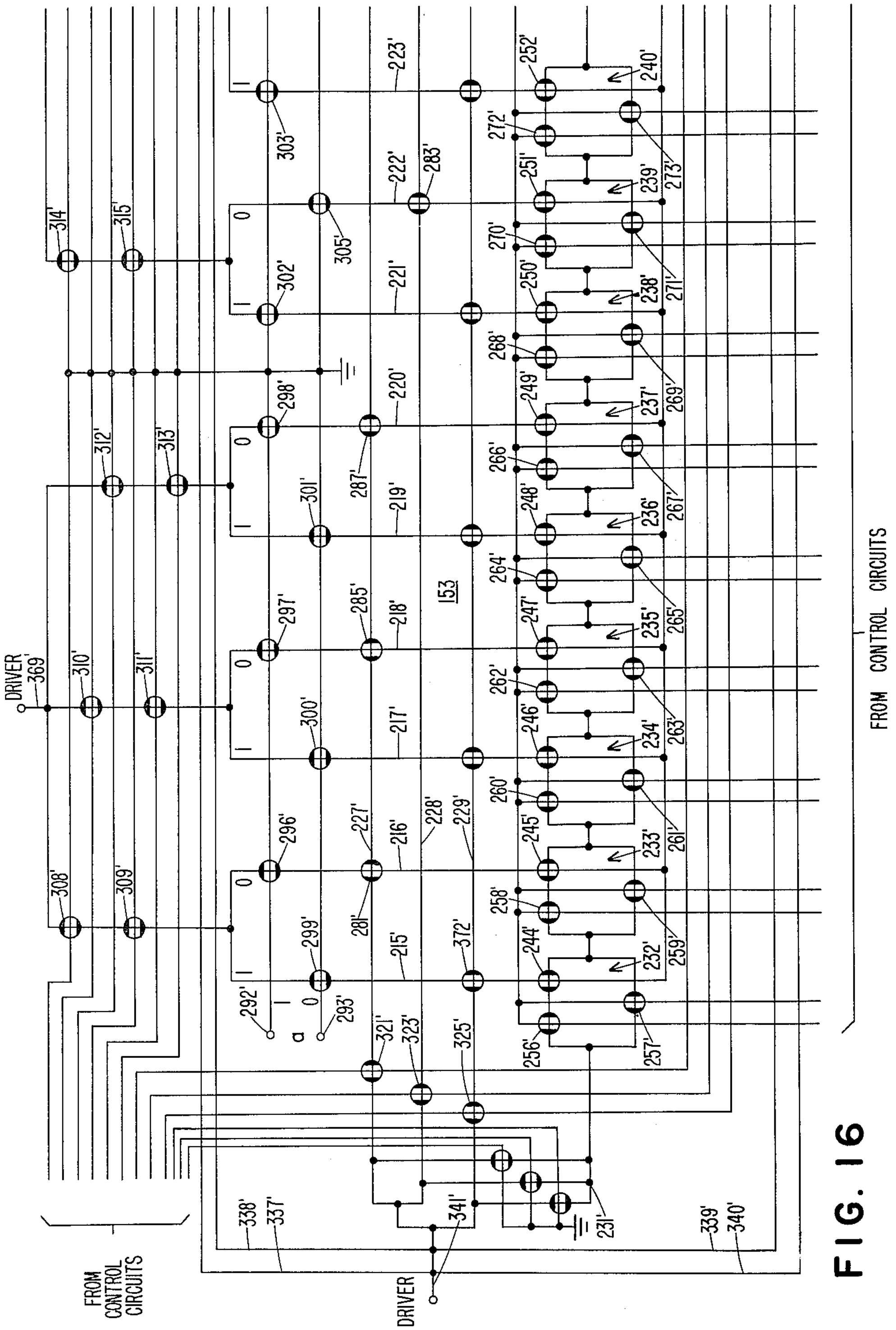
Figure 17:
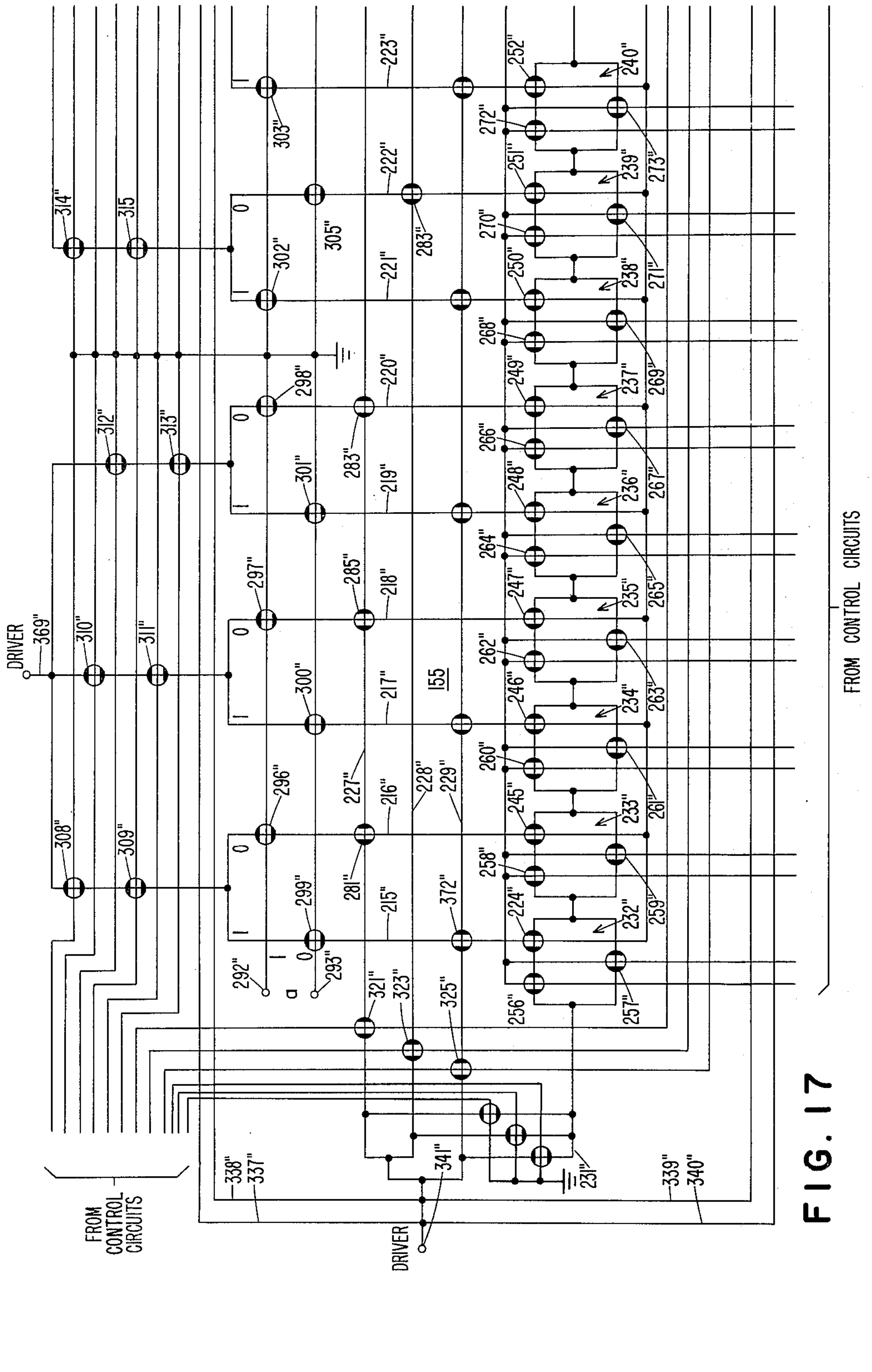
Figure 18:
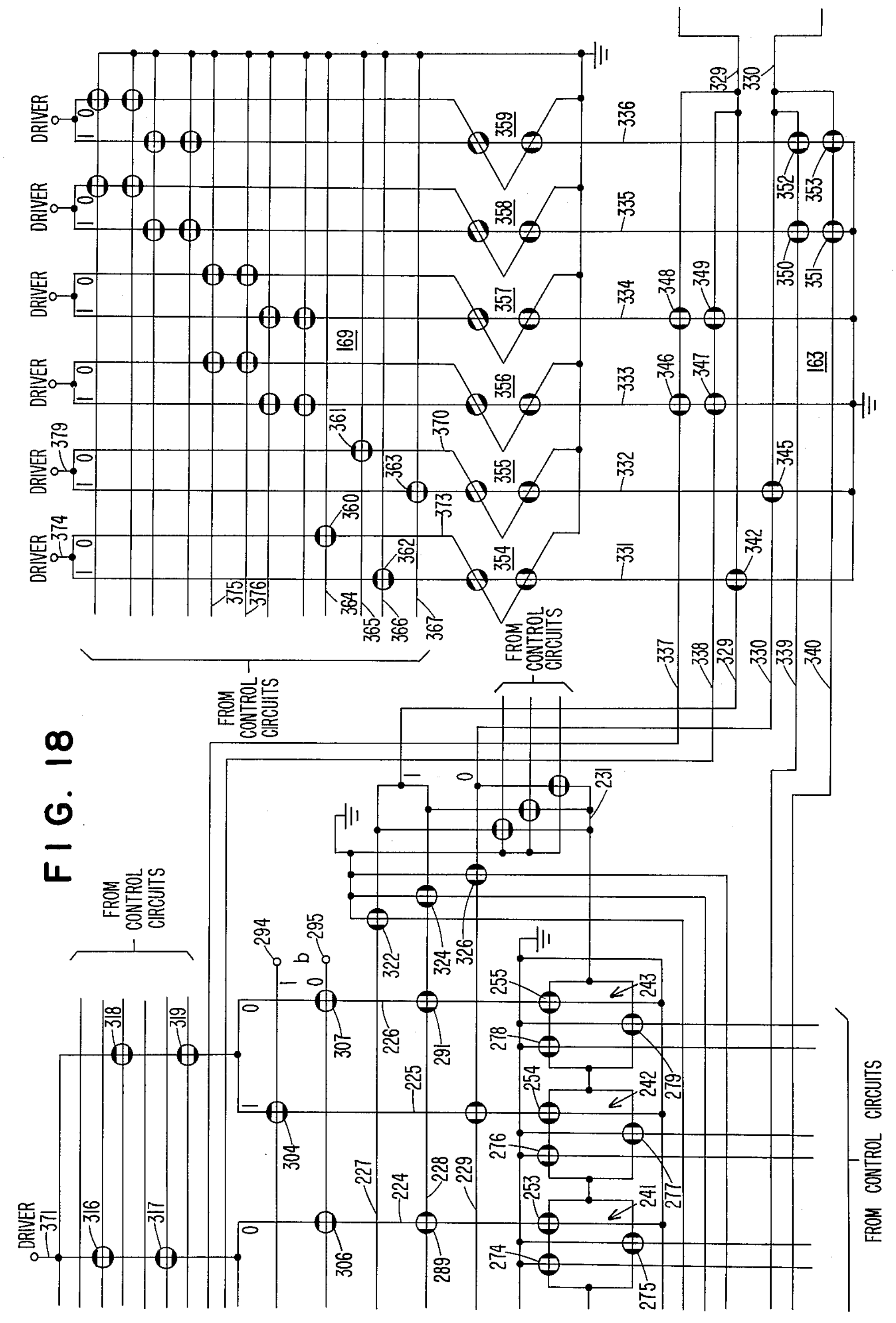
Figure 19:
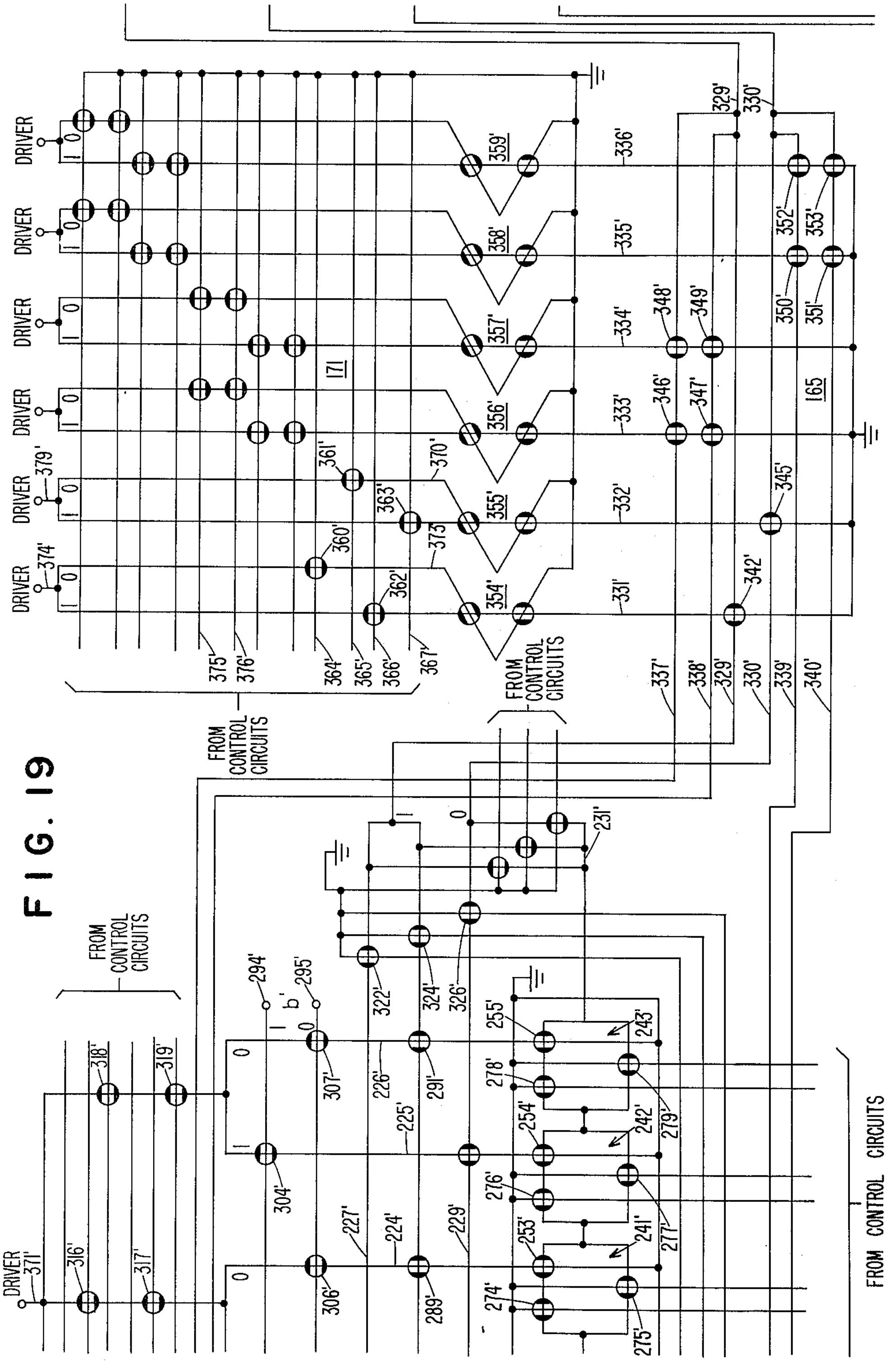
Figure 20:
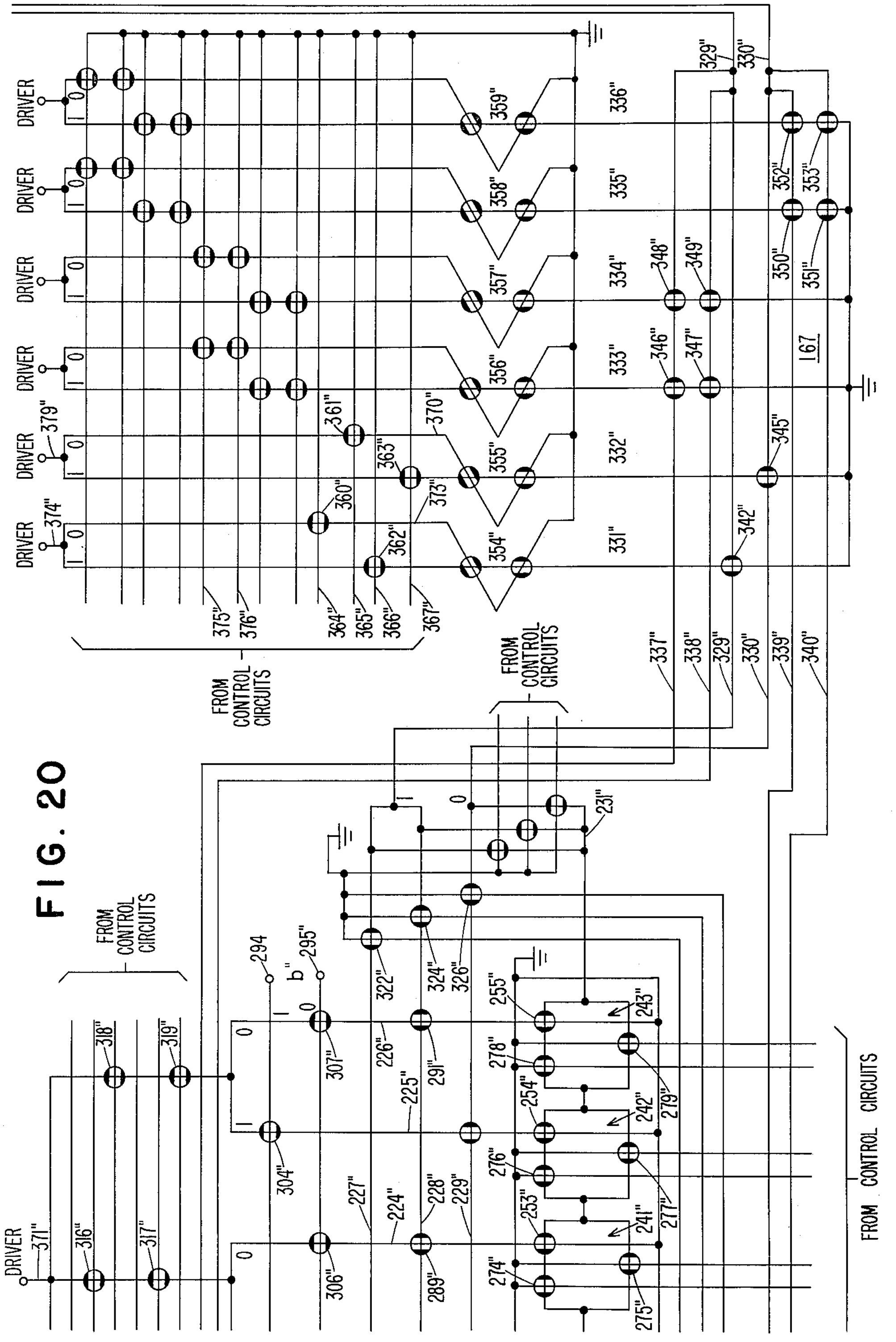
Figure 21:
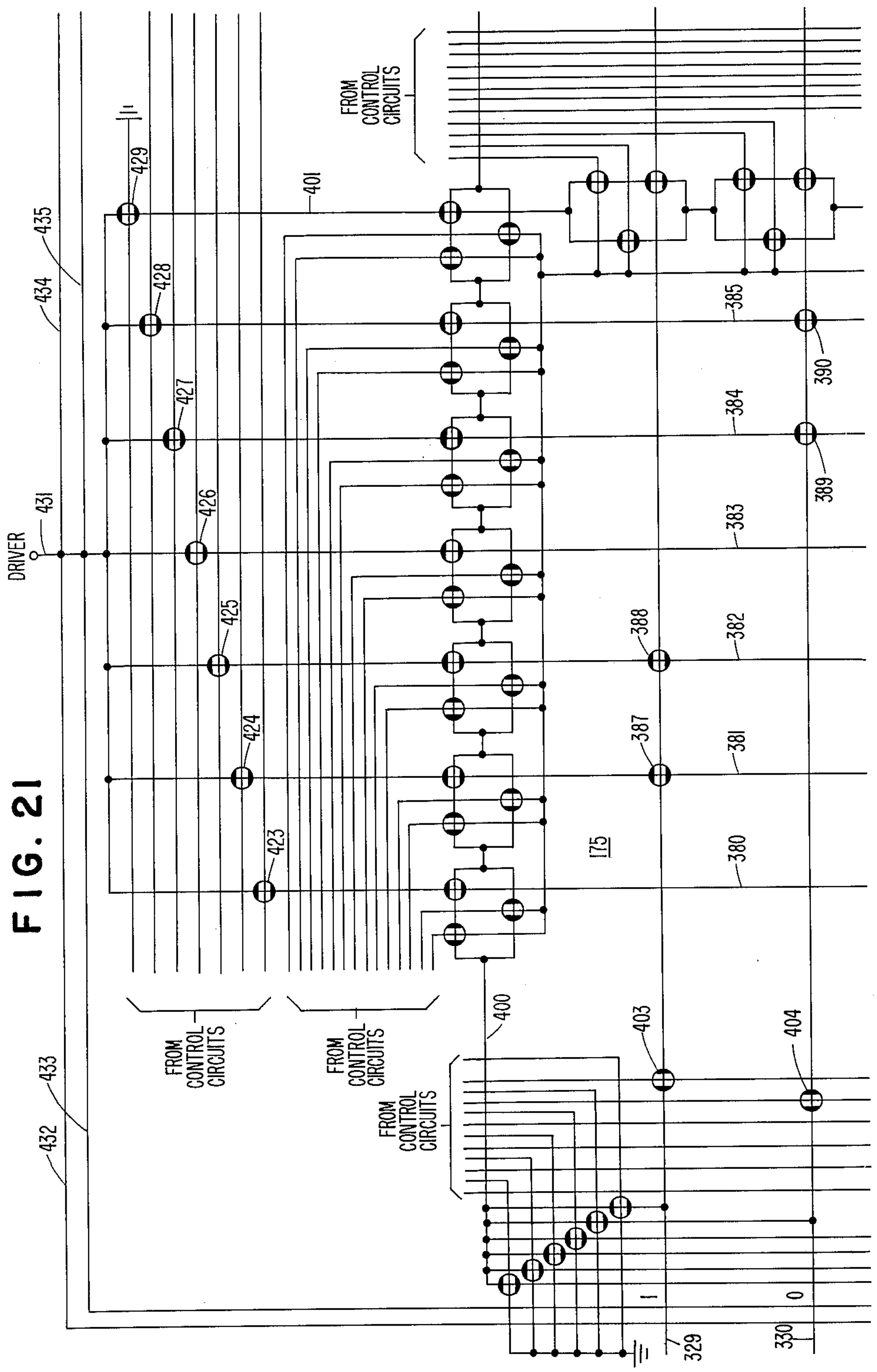
Figure 22:
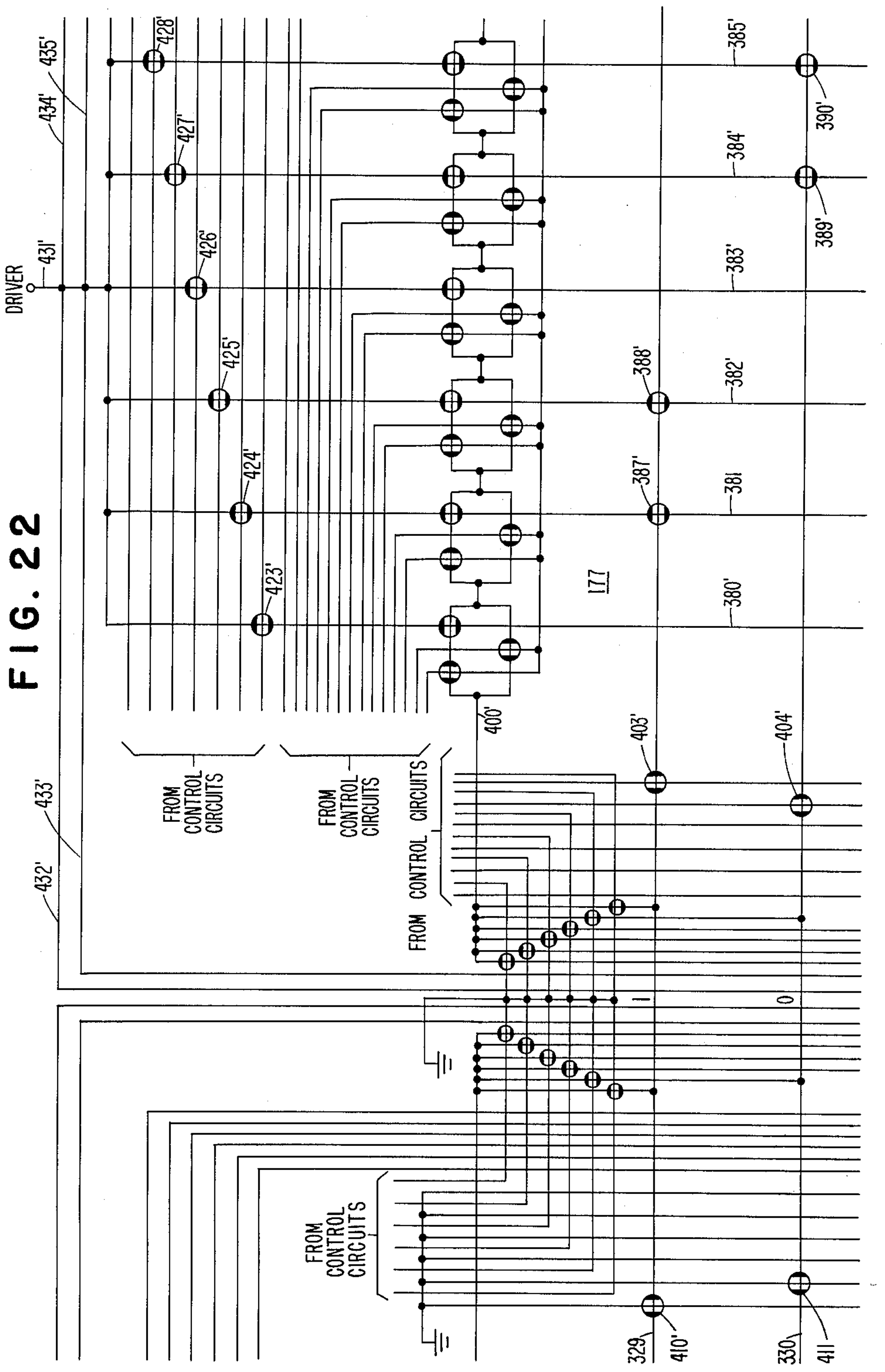
Figure 23:
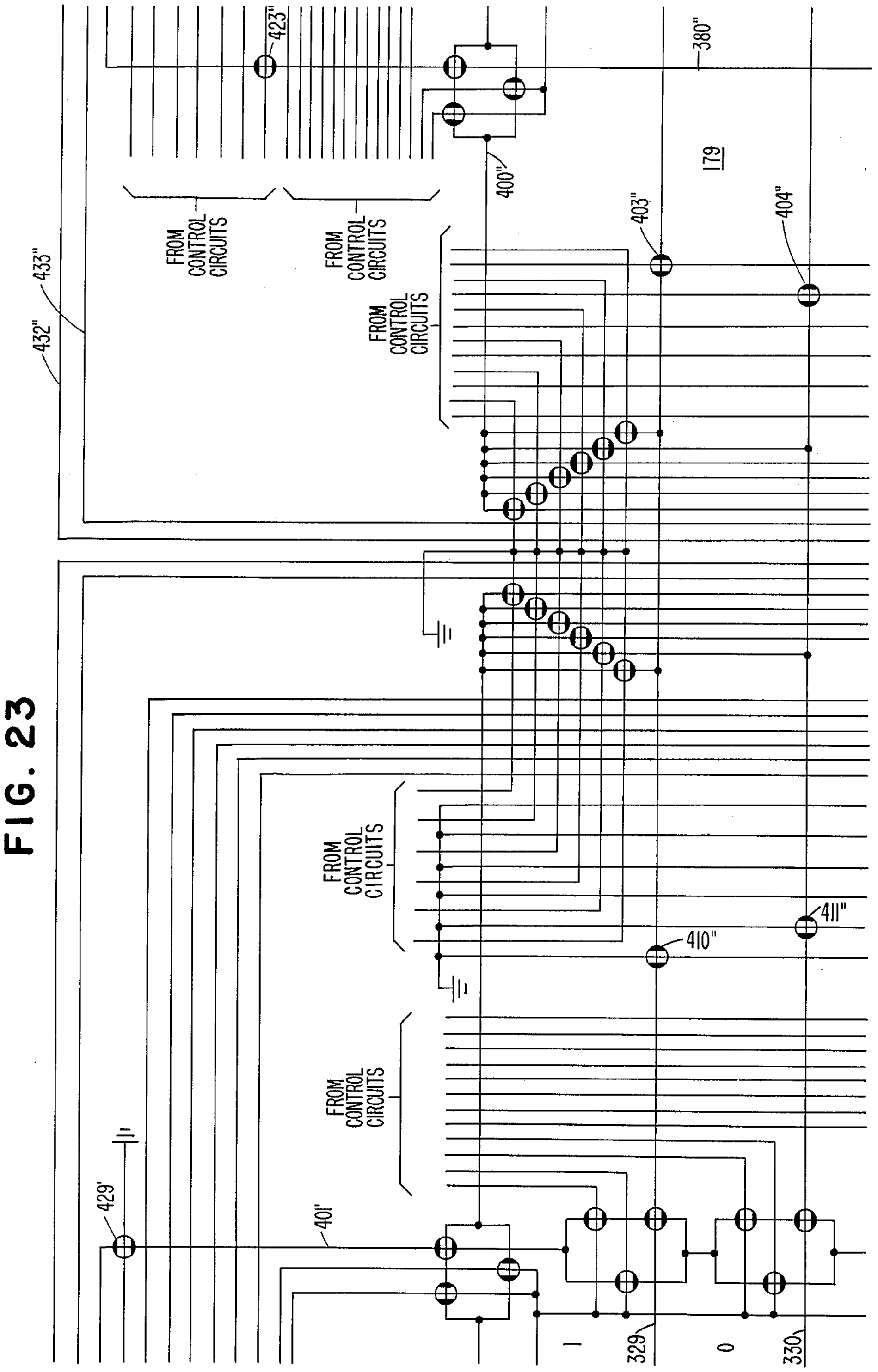
Figure 24:
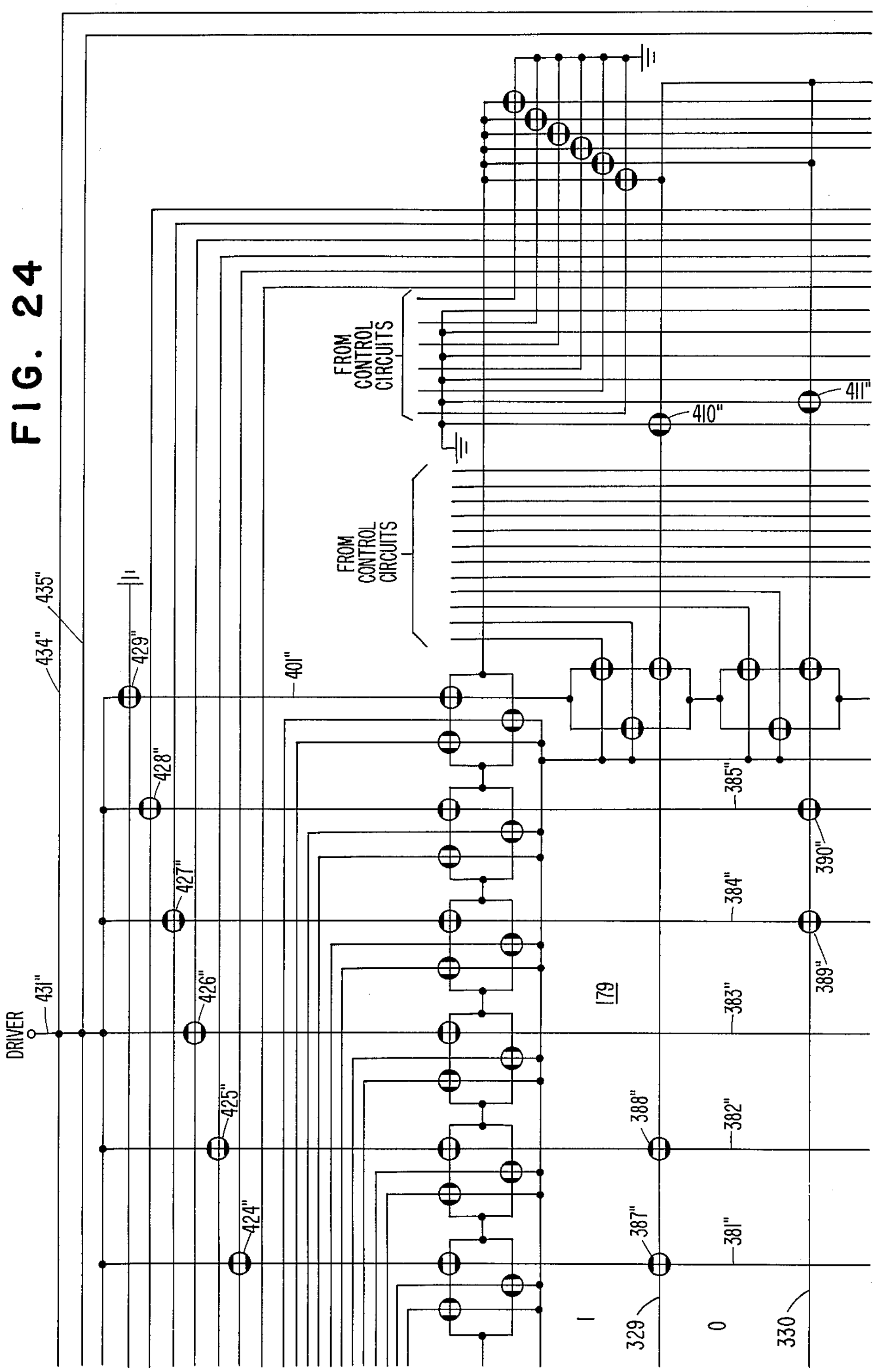
Figure 25:
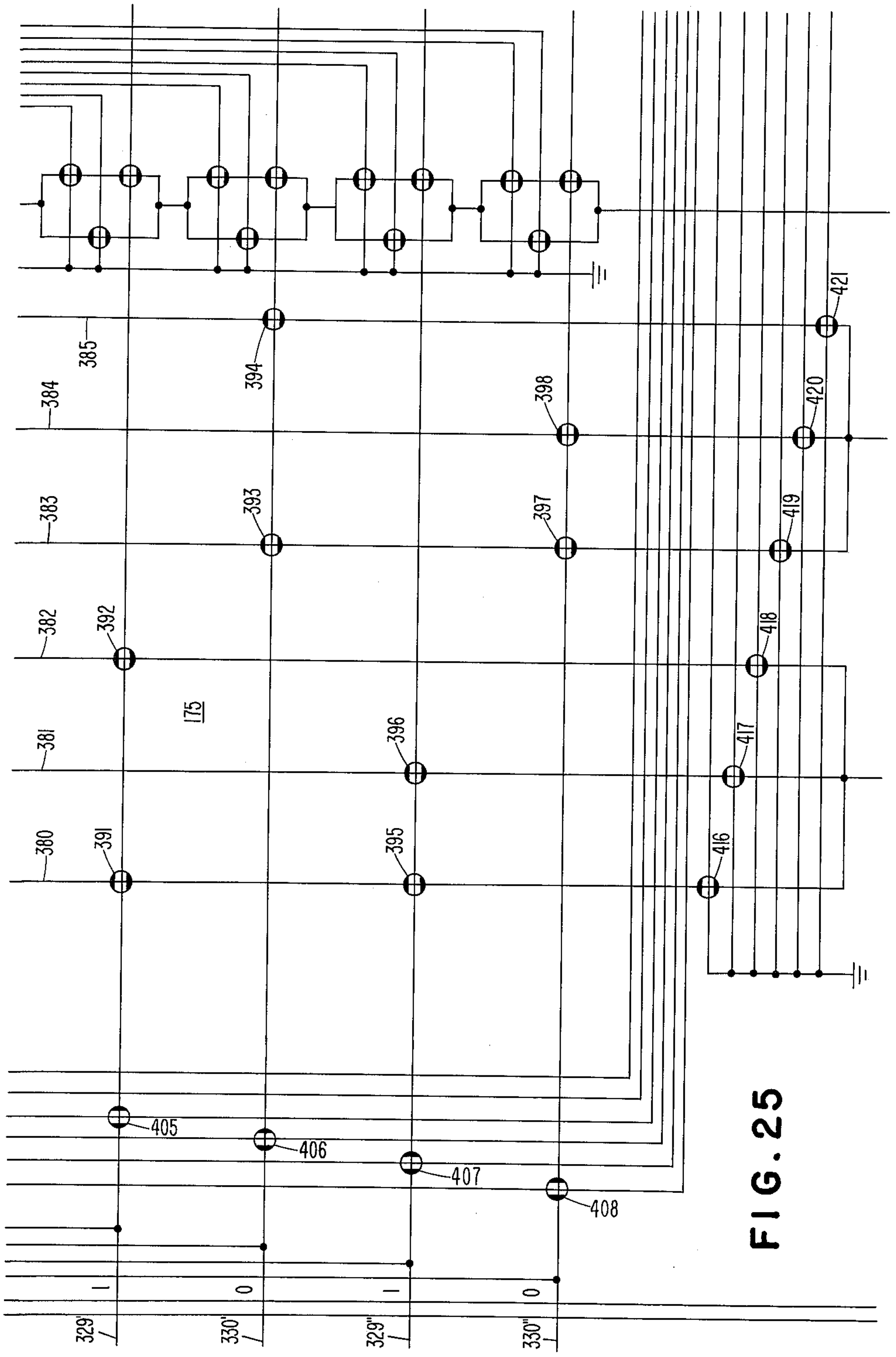
Figure 26:
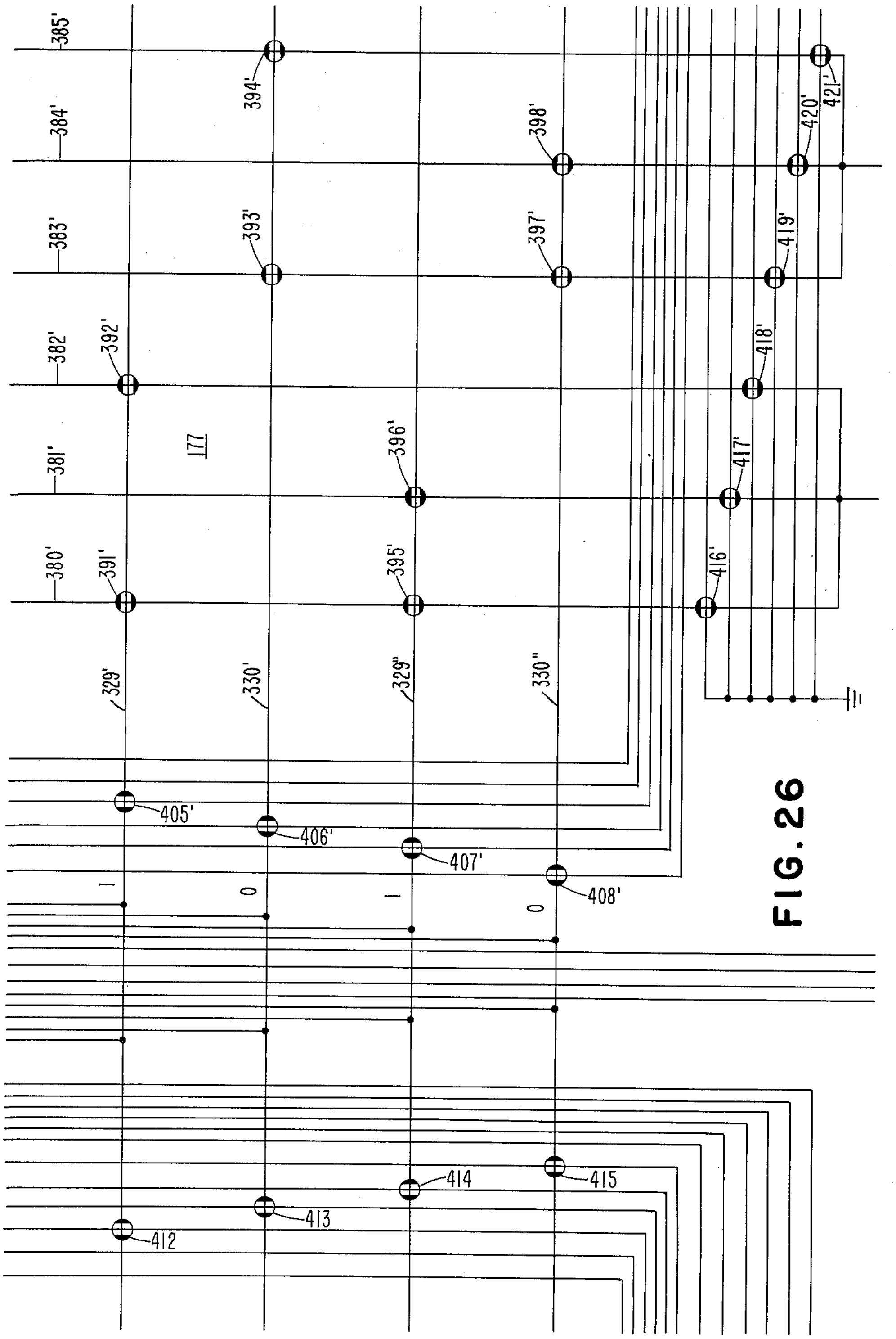
Figure 27:
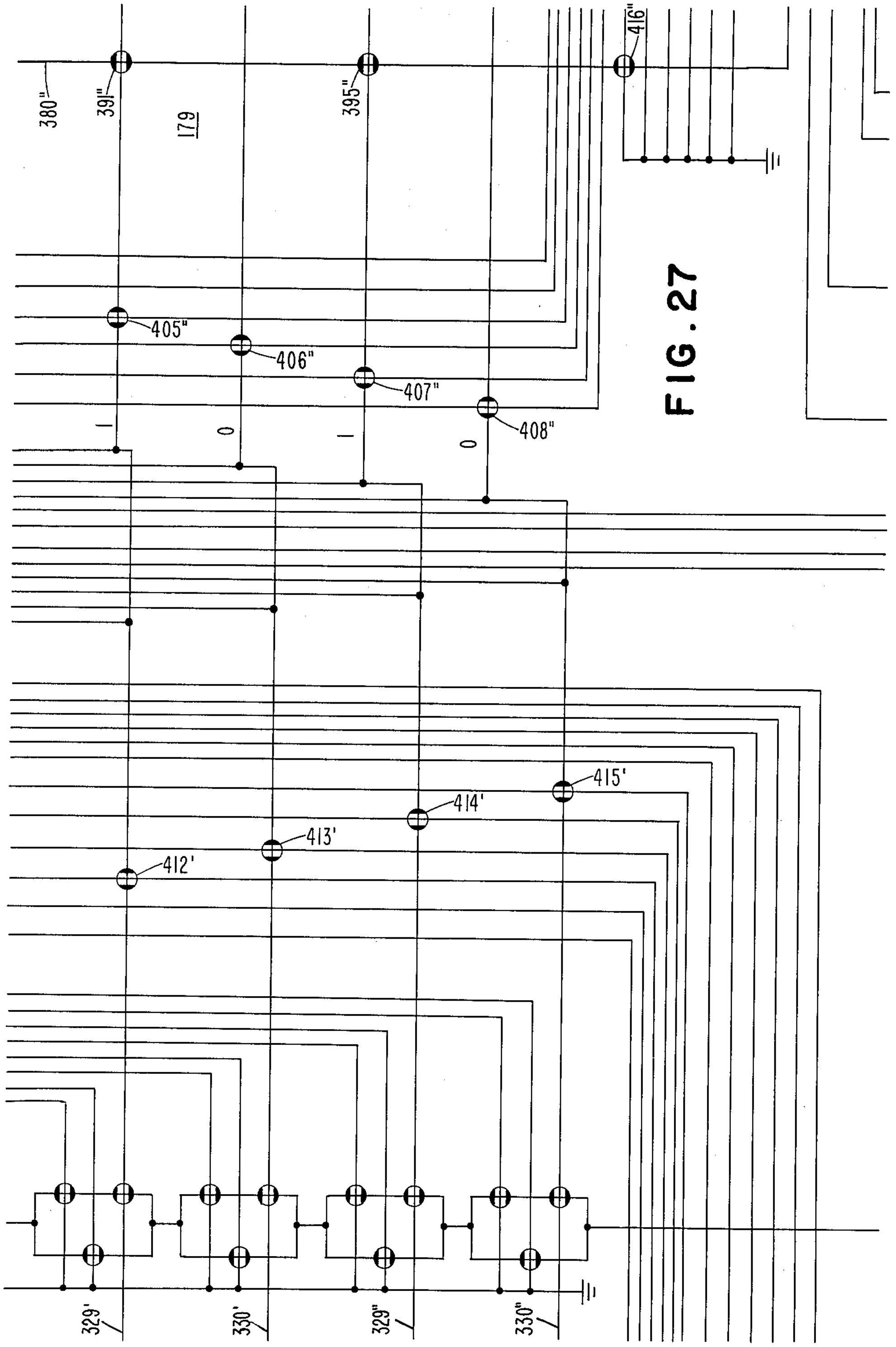
Figure 28:
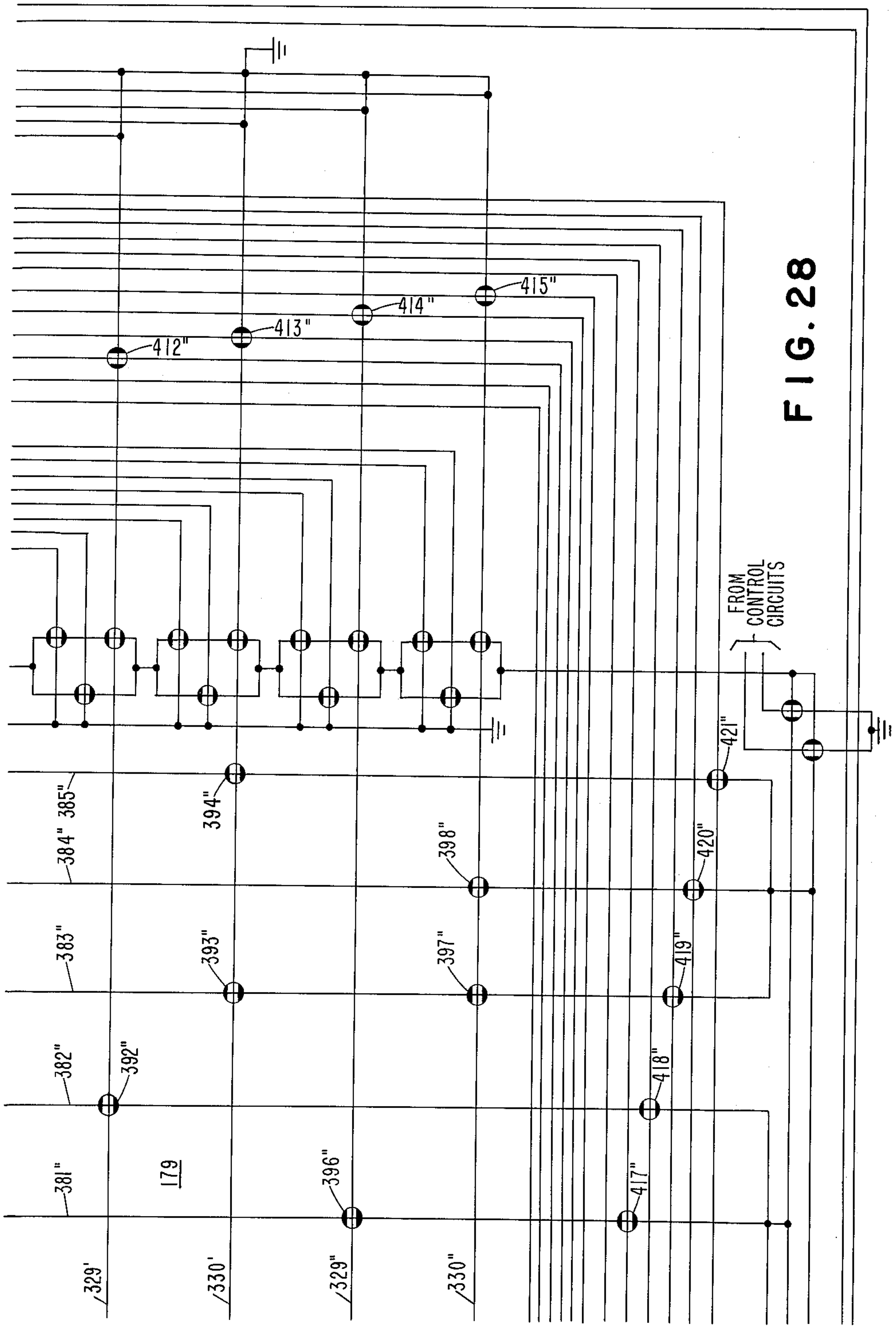

FIGS. 15 through 41 are detailed showings of the circuitry shown in block form in FIGS. 13 and 14. FIGS. 15 through 41 should be assembled together as indicated in FIG. 43. Referring now to FIGS. 15 and 18, which shown the details of logic array 151 of FIG. 13, the function $f_1=a\vee b$ and $\bar{f}_1=\overline{ab}$ is realized. The basic array comprises vertical wires 215, 216, 221 and 222 with horizontal crossing wires 227, 228 and 229. Two pairs of special purpose spare vertical lines 217, 218 and 219, 220 are provided for wires 215 and 216. Similarly, two pairs of special purpose spares are provided for wires 221 and 222. These pairs are denoted by the numerals 223, 224 and 225, 226. A special purpose spare is a component which is an exact copy of the original component with which it is associated. The spare is not used until the original component becomes defective, at which time the defective original component is switched out of the circuit, and the spare is switched in. Details of the principles of operation and construction of special purpose spare elements may be obtained by referring to the copending application of James H. Griesmer et al. entitled Error Correction Device Serial No. 18,601 filed March 30, 1960 and assigned to the assignee of the present application.

A general purpose spare wire 231 is provided for the horizontal wires 227 to 229. This general purpose spare includes twelve serially connected cells denoted by the numerals 232 to 243. The cells 232 to 243 are provided with main inhibitor elements 244 to 255, respectively. These main inhibitor elements are controlled by control inhibitor elements 256 to 279 which are associated in pairs, respectively, with cells 232 to 243. A general purpose spare is a component which may be set up by means of a control switching system to simulate exactly the function of any defective component with which it is associated. Details of the general purpose spare operation and construction may be obtained by referring to the copending application of Raymond E. Miller et al. entitled Error Correction Device Serial No. 46,264 filed July 29, 1960, and assigned to the assignee of the present application.

The function $f_1=a\vee b$ is realized by placing an inhibitor element 281 at the intersection of lines 216 and 227 and an inhibitor element 283 at the intersection of lines 222 and 228. The special purpose spare wires 218 and 220 contain duplicate inhibitor elements 285 and 287, and the special purpose spare wires 224 and 226 contain duplicate inhibitor elements 289 and 291.

The inputs to the vertical wires of the array are controlled by terminal pairs 292, 293 and 294, 295, which represent "*a*" and "*b*" variables, respectively. Inhibitor elements 296 to 298 disposed along the intersection of the line from terminal 292 with each of vertical wires 216, 218 and 220, and the inhibitors 299 to 301 disposed along the intersections of the line from terminal 293 with each of vertical wires 215, 217 and 219 control the "*a*" variable input signals. Similarly, inhibitors 302 to 304 and 305 to 307 control the "*b*" variable inputs.

Wire pairs 215, 216 may be removed from the active circuit by means of inhibitor elements 308 and 309. These inhibitors are redundant to increase the reliability of operation. Similarly, wire pairs 217, 218 may be biased off by means of inhibitor elements 310 and 311, wire pairs 219, 220 by means of inhibitor elements 312, 313, wire pairs 221, 222 by means of inhibitor elements 314, 315, wire pairs 223, 224 by means of inhibitor elements 316, 317 and wire pairs 225, 226 by means of inhibitor elements 318, 319. Since all of these wire pairs form original components and special purpose spares, there is no necessity for biasing off the wire pairs on both sides of the array, and on one side of the array each of these pairs is run to a common ground point.

The horizontal lines 227 to 229 are biased off by means of inhibitor elements 321 and 322, 323 and 324, and 325 and 326. The general purpose spare is connected at both ends to each of lines 227 to 229, and each one of the connecting lines must be provided with an inhibitor to prevent the short-circuiting of the array. The bias-off inhibitors for the vertical and horizontal lines are controlled by signals received from the control circuitry 157 indicated generally in FIGS. 13 and 14. The arrays 153 and 155 of FIG. 13 are illustrated in FIGS. 16 through 20. These arrays are substantially identical to the array 151 described in connection with FIGS. 15 and 18. Corresponding elements in the arrays 151, 153 and 155 are correspondingly numbered with a prime and a double prime notation being made on the elements of arrays 153 and 155, respectively.

The output from array 151 is obtained along lines 329 and 330 which cross lines 331 to 336 forming bypass circuit 163 shown in FIG. 13. Redundant bypass lines 337, 338 and 339, 340 are connected to driver line 341 and the function output lines 329 and 330, respectively. Inhibitor elements 342 and 345 through 353 are placed at the intersections of the bypass and function output lines. Lines 331 through 336 constitute the "1's" side of a plurality of flip-flops indicated by the numerals 354 through 359. Each of these flip-flops has redundant control inhibitors such as inhibitors 360, 361 and 362, 363 controlled by lines 364 through 367. In addition to the redundancy of the wires from the control circuits, each of the flip-flops 356 and 358 is provided with a special purpose spare flip-flop 357 and 359, respectively.

Referring once again to the logic array 151 shown in FIGS. 15 and 18, let it be assumed that no defective components are present and that inhibitors 310 through 313 and 316 through 319 are activated to bias off the special purpose spares and that inhibitors 308, 309 and 314, 315 are not activated so that the lines 215, 216, 221 and 222 are included in the active circuit. Further, let it be assumed that all of the inhibitors on general purpose spare 231 are activated to bias off that element, and that inhibitors 321 through 326 are not activated leaving horizontal lines 227 through 229 in the active circuit. When the "*a*" variable terminal 292 and the "*b*" variable terminal 294 receive input signals, lines 216 and 221 are inhibited causing a current path to exist from driver terminals 369 and 371 through wires 215 and 222, respectively, to ground. Horizontal function line 228 is then inhibited by inhibitor 283 at the intersection of lines 222 and 228, but an alternate current path exists in horizontal function line 227 so that an output is obtained on line 329. No output is obtained on output line 330 which is continuation of horizontal function wire 229, since the current in vertical wire 215 activates inhibitor 372 to block current in this line. It will be appreciated that the bypass circuit can be employed to force any desired output to appear on the portion of lines 329 and 330 to the right of this circuit. If it is desired that a signal appear on line 330 while no signal is on line 329 this may be accomplished even though the logic array 151 is indicating an output on line 329 and none on 330. Flips-flops 354 and 355 of FIG. 18 are activated to bias off the output of logic array 151 by control signals along lines 364 and 365 from the control circuitry 157. These signals inhibit lines 373 and 370 to force current from drivers 374 and 379 through lines 331 and 332 to activate inhibitors 342 and 345. Then, by applying signals to lines 375 and 376, flip-flops 356 and 357 will produce signals along lines 333 and 334 inhibiting bypass lines 337 and 338 to force current from driver line 341 through bypass lines 339 and/or 340 to produce a signal on line 330 to the right of bypass circuit 163. It will be appreciated from this description that any desired output signal can be obtained by utilizing the bypass circuit and control shown.

FIGS. 21 through 28 are detailed illustrations of three majority circuits, each of which has an output equal to the value of the majority of the inputs obtained from the bypass circuits 163, 165 and 167. The basis array of the first majority circuit is made up of vertical lines 380 to 385 which have inhibitors 387 to 398 disposed at selected crossings within input lines 329, 330, 329′, 330′, 329″ and 330″. A general purpose spare wire 400 is provided for the input lines (horizontal) and a general purpose spare wire 401 is provided for the function wires (vertical). Inhibitor elements 403 to 408 and 410–415 are disposed along the horizontal input wires on either side of the majority array to bias off the wires when a defect occurs, and inhibitors 416 to 429 are disposed on either side of the majority array on the vertical function lines. The bias inhibitors and the inhibitors in the cells of spare 400 and spare 401 are controlled by signals from the control circuitry 157 of FIGS. 13 and 14.

Figure 29:
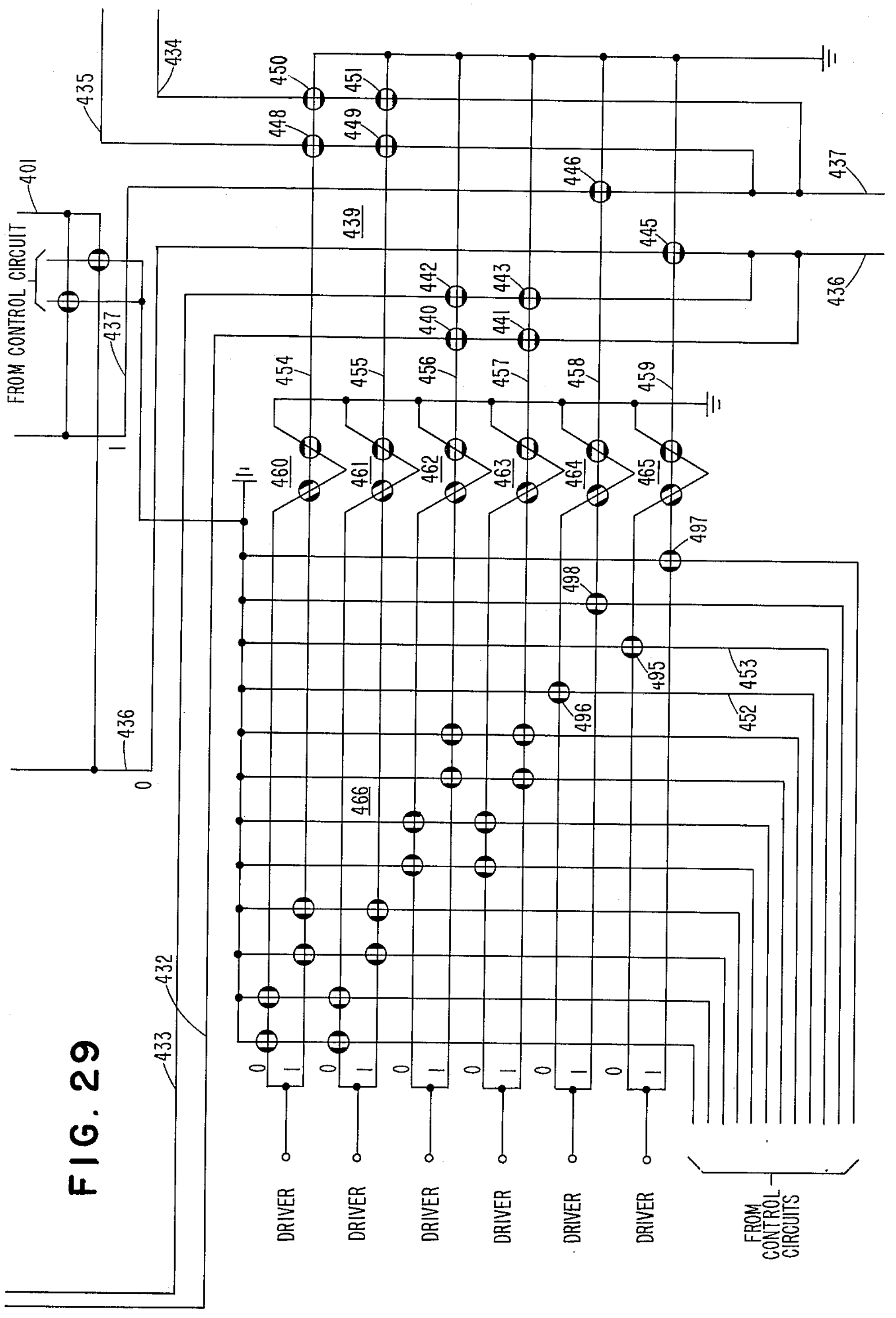
Figure 30:
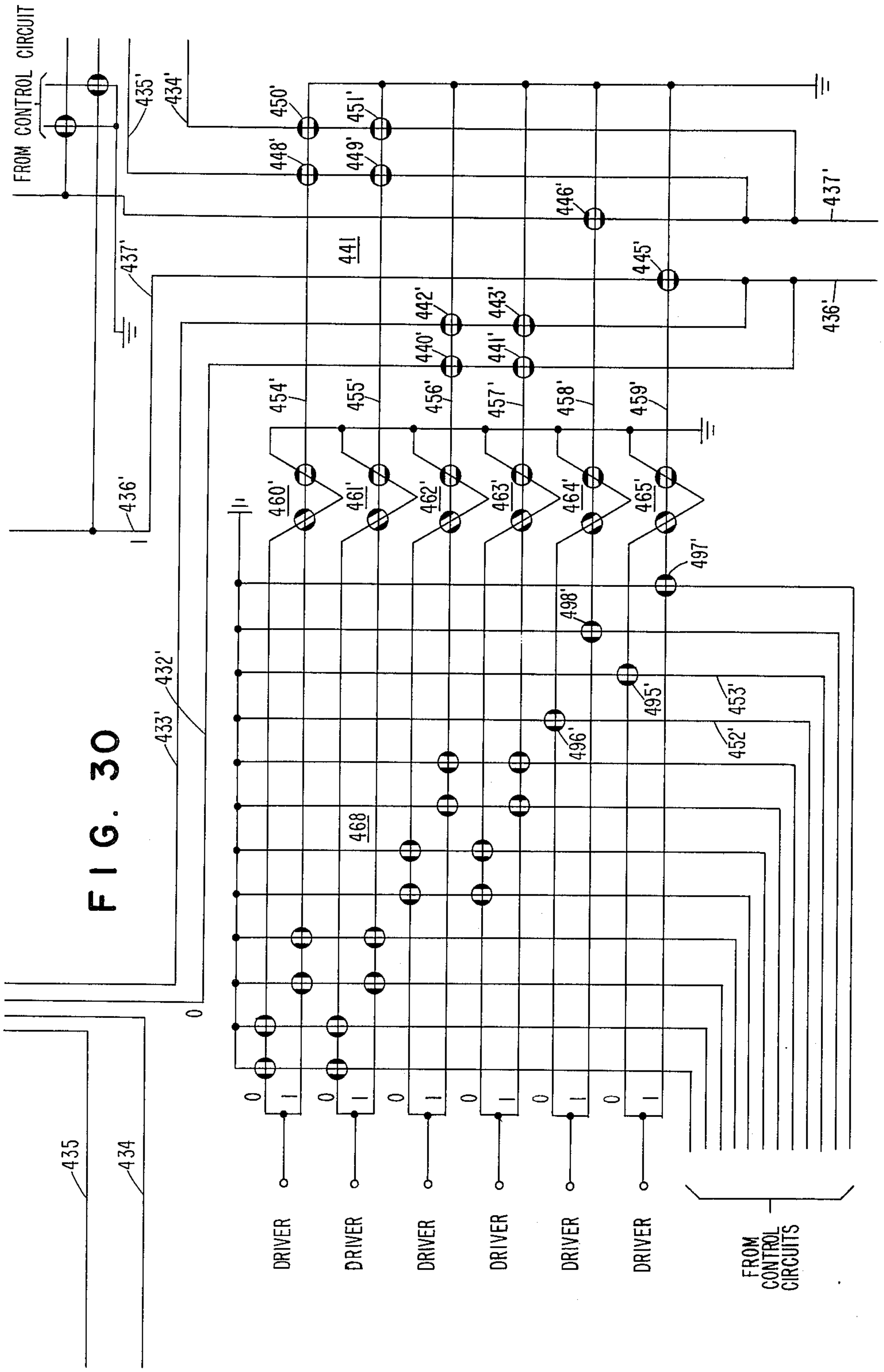
Figure 31:
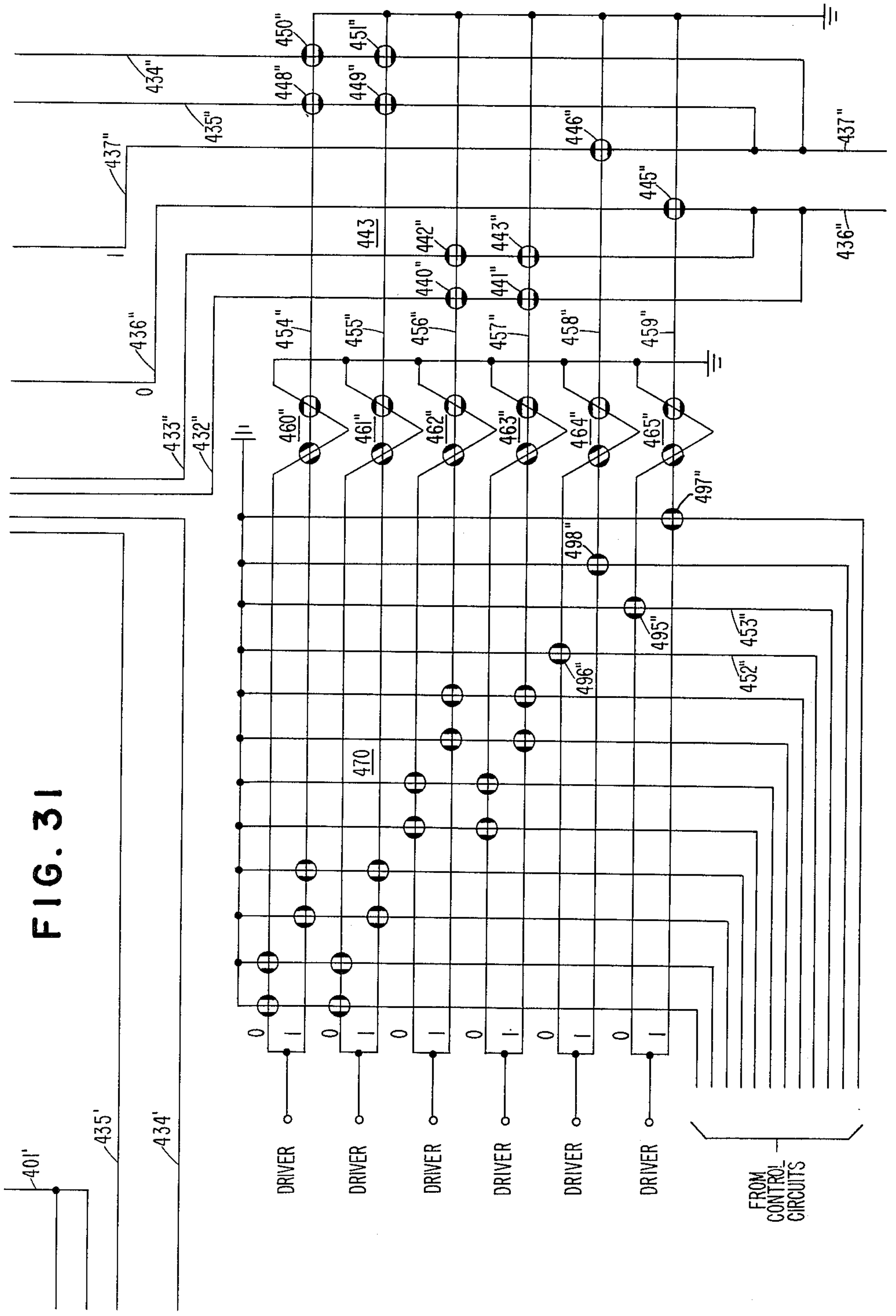
Figure 32:
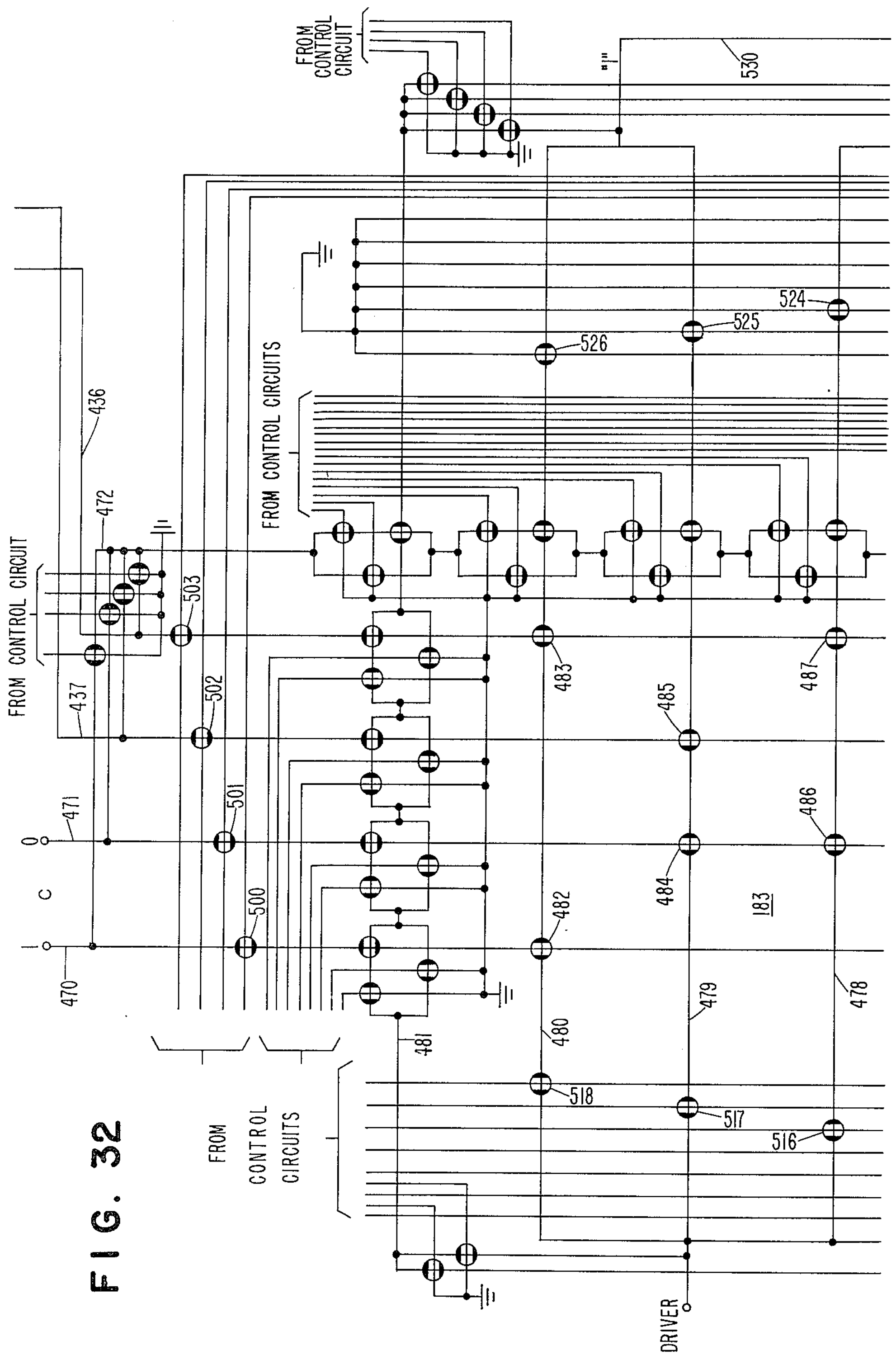
Figure 33:
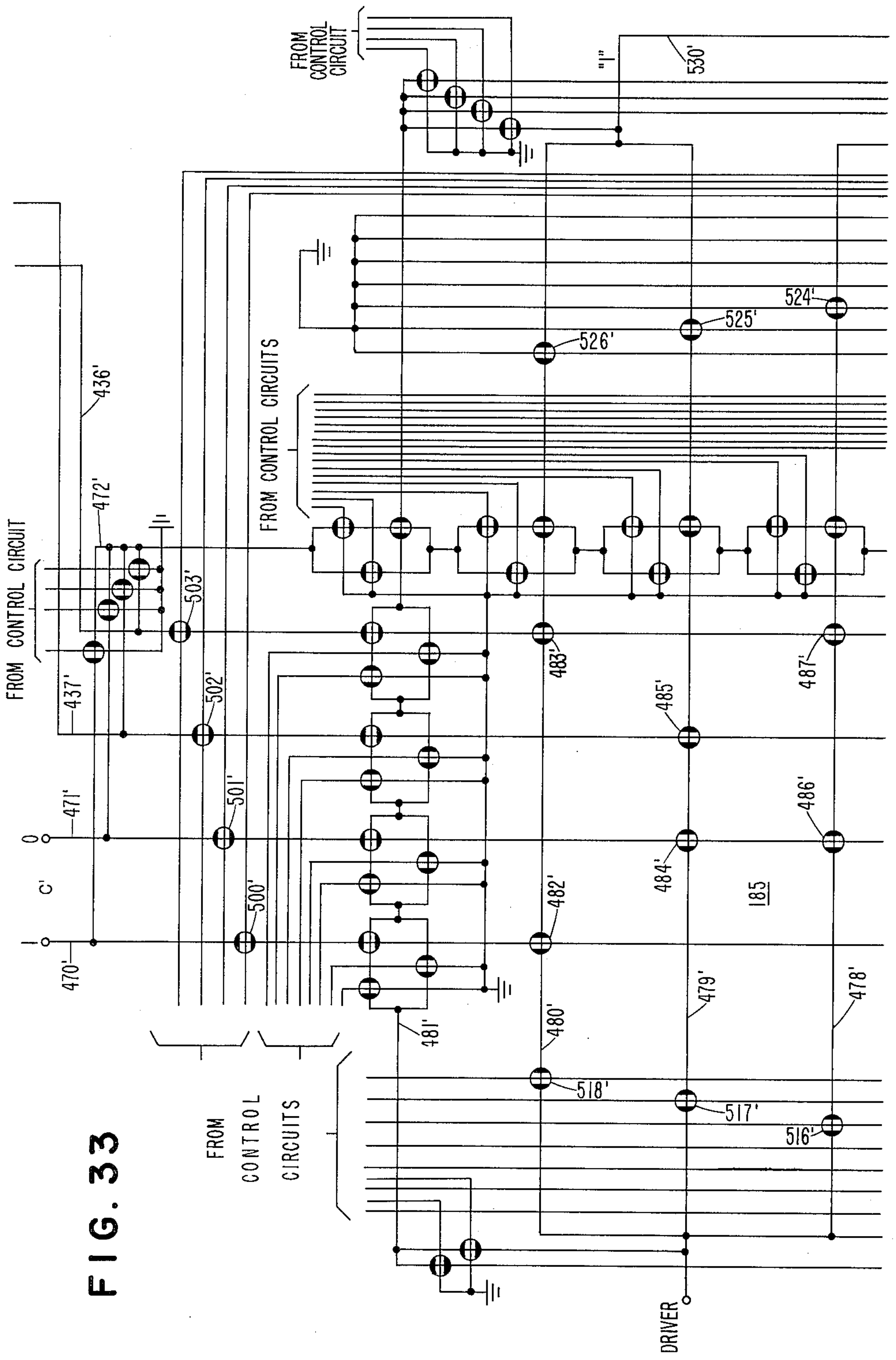
Figure 34:
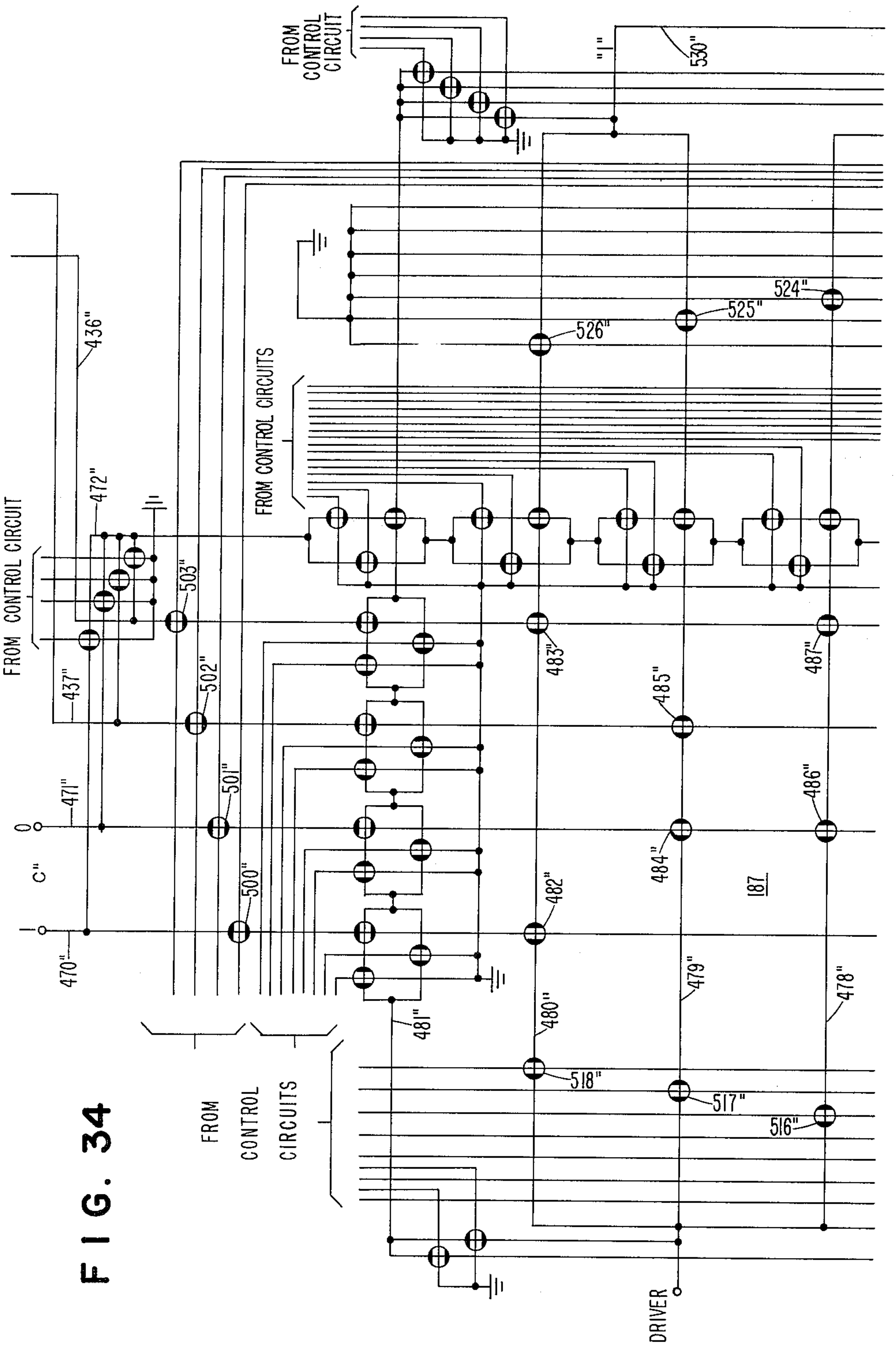
Figure 35:
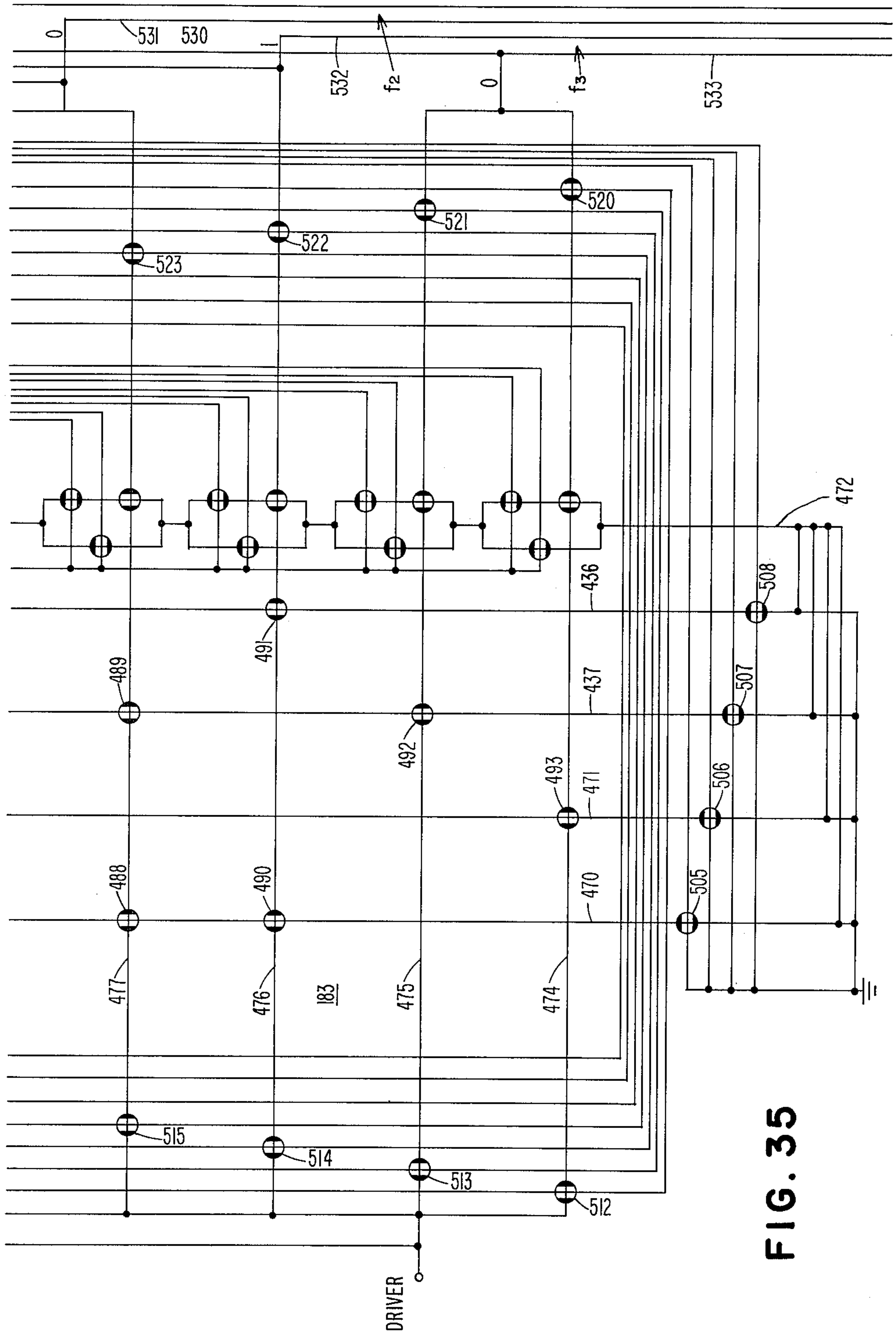
Figure 36:
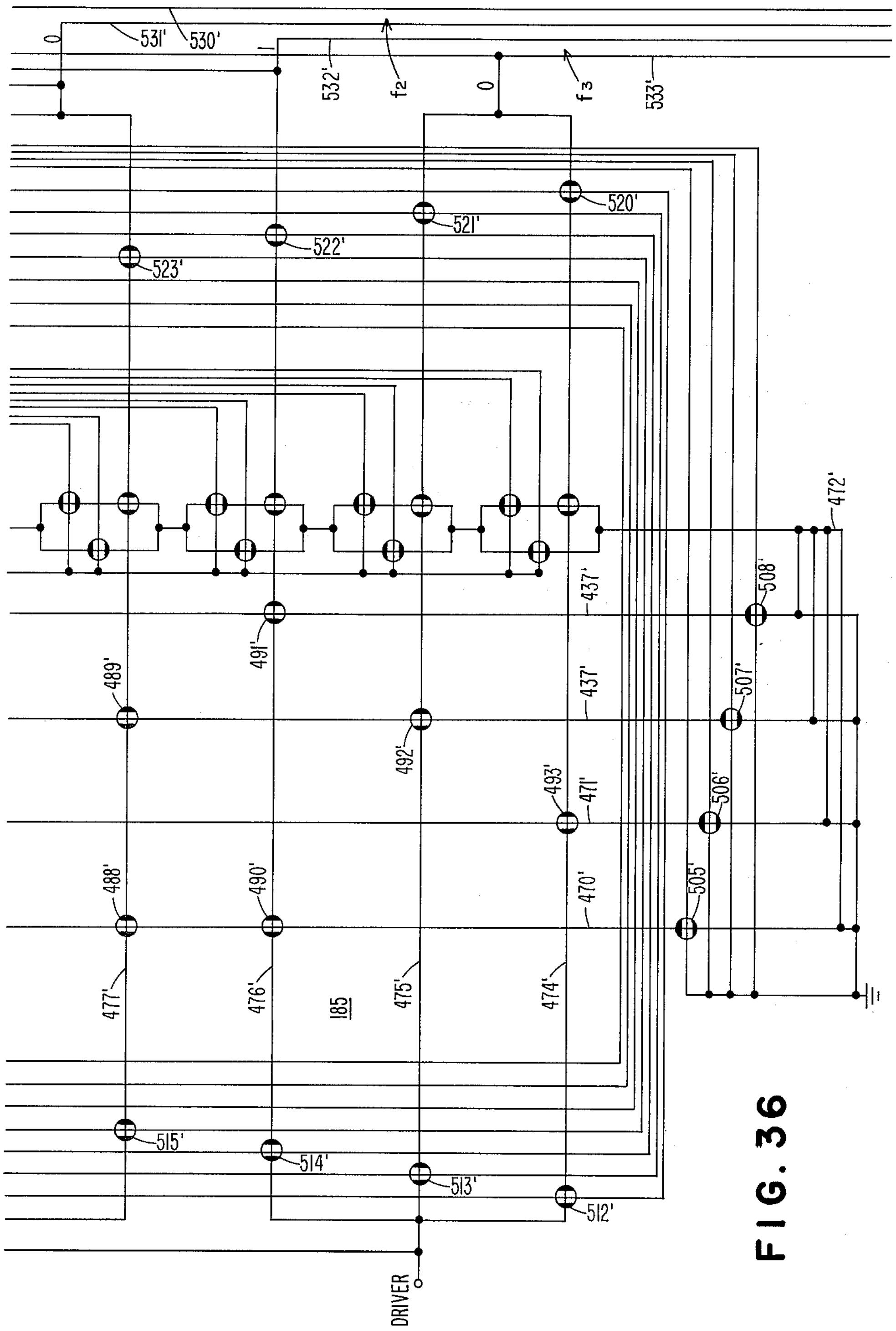
Figure 37:
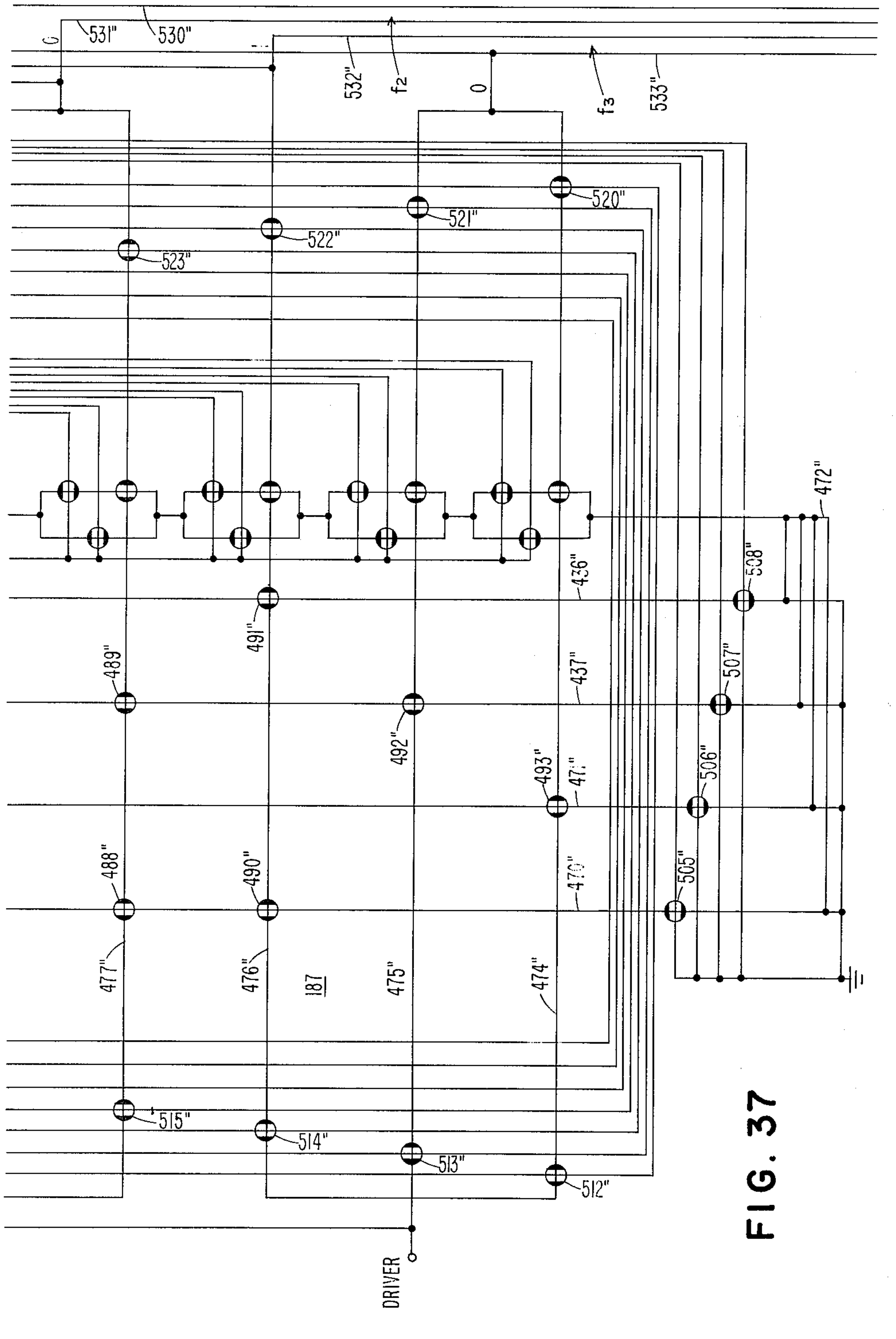

Bypass wires 432, 433 and 434, 435 are connected between driver line 431 and output lines 436 and 437 of the majority circuit. The bypass lines 432 to 435 are controlled by means of inhibitors 440 to 443 and 448 to 451, respectively, as shown in FIG. 29. The majority output circuit lines 436 and 437 are controlled by means of inhibitors 445 to 446. Lines 454 to 459 from flip-flops indicated generally by the numerals 460 to 465, respectively, control the inhibitors 440 to 451 disposed on the bypass lines and output lines from the majority circuit. Both the bypass lines and the control circuitry associated therewith have redundant components to increase the reliability of operation. Flip-flops 460 to 465 are controlled by an array indicated generally by the numeral 466 which is similar in operation to the control array 169 described previously in connection with logic array 151.

The three majority circuits and their associated control circuitry are identical in construction and operation and the components in the second and third majority circuits corresponding to the first majority circuit described are denoted by primed and double primed numerals, respectively.

FIGS. 32 to 37 illustrate the details of triplicate logic stages 183, 185 and 187. Each of these stages realizes the function $f_2=\bar{c}d\vee c\bar{d}$, $\bar{f}_2=cd\vee\overline{cd}$, $f_3=\bar{c}d$ and $\bar{f}_3=c\vee\bar{d}$, where $c$ is a third variable introduced into stage 183 and $d$ is the resulting function from the logical operation upon variables $a$ and $b$ of array 151. The $c$ variable is introduced on vertical lines 470 and 471 of the array 183, while the $d$ variable is introduced on lines 436 and 437 of this array. A general purpose spare wire 472 is provided for the variable lines. The horizontal function lines 474 to 480 are provided with a general purpose spare wire 481. Inhibitors 482 to 493 are disposed at selected cross-overs of the variable and function wires in accordance with functions $f_2$ and $f_3$ expressed above. Inhibitor elements 500 to 503 and 505–508 placed on either side of the array 183 on the vertical lines to bias off any defective components. Similarly, inhibitor elements 512 to 518 and 520 to 526 are provided on the horizontal lines on either side of array 183.

The output of function $f_2$ is obtained on lines 530 and 531, and the output of function $f_3$ is obtained on lines 532 and 533. The logic arrays 183, 185 and 187 are identical in construction and operation and primed and doubled primed numerals have been used in arrays 185 and 187 to denote parts corresponding to array 183.

Figure 38:
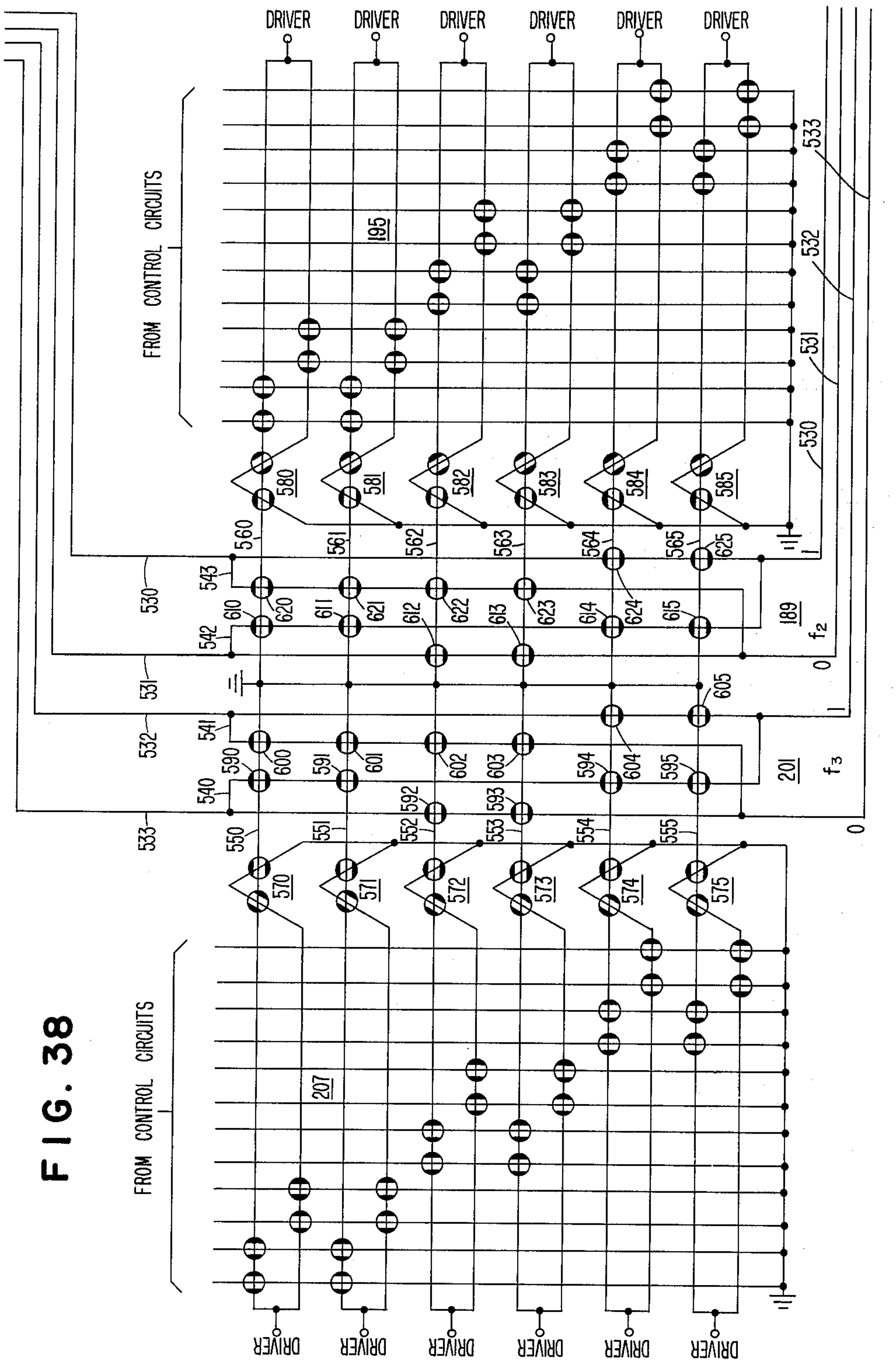
Figure 39:
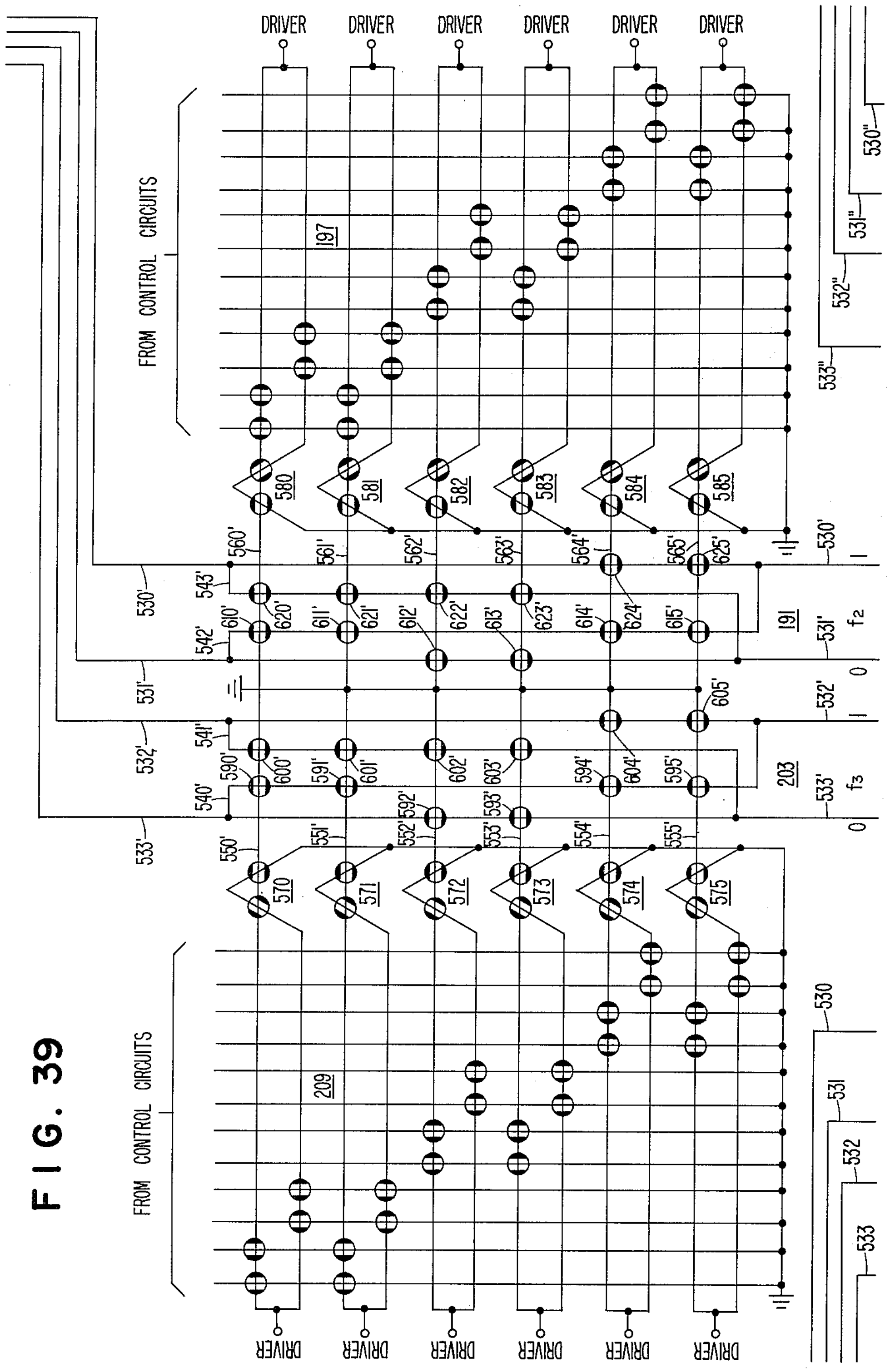
Figure 40:
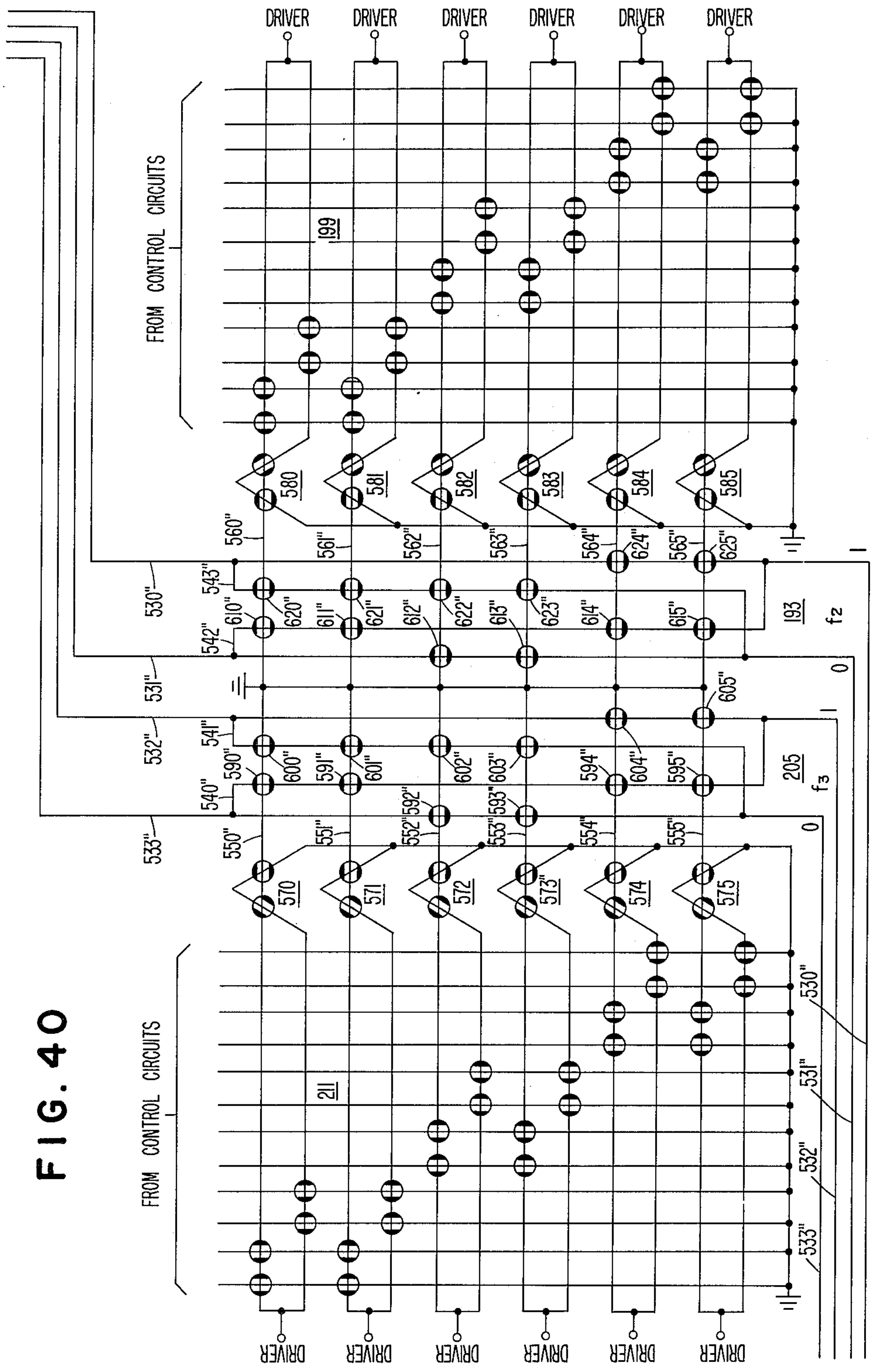

FIGS. 38 to 40 illustrate details of the bias and bias control circuits associated with logic arrays 183, 185 and 187. Here again, corresponding primed and double primed numerals are used to denote corresponding parts of the arrays. Input lines 530 to 533 to the bias circuits 189 and 201 are controlled by currents on lines 560 to 565 and 550 to 555, which are controlled by flip-flops indicated generally by the numerals 580 to 585 and 570 to 575, respectively. Lines 540 and 541 are connected between lines 532 and 533. Lines 532 and 533 together with lines 540 and 541 make up the bias current paths which are controlled by inhibitors 590 to 595 and 600 to 605 placed at selected crossover points with lines 550 to 555. Similarly, lines 530 and 531 are connected together by lines 542 and 543 to make up bias current paths in the bias circuit 189. Inhibitors 610 to 615 and 620 to 625 are disposed at selected crossover points with lines 560 to 565 to enable the desired control to be effected.

Bias control circuit 207 containing flip-flops 570 to 575 is made up of redundant inhibitor logic activated from the control circuits 157 of FIGS. 13 and 14. Similarly, bias control circuit 195, made up of flip-flops 580 to 585, is also controlled from the circuitry 157. Redundancy is used in each of these circuits to increase the reliability. The operation of these circuits is the same as the bias circuit of FIG. 8 discussed previously.

Figure 41:
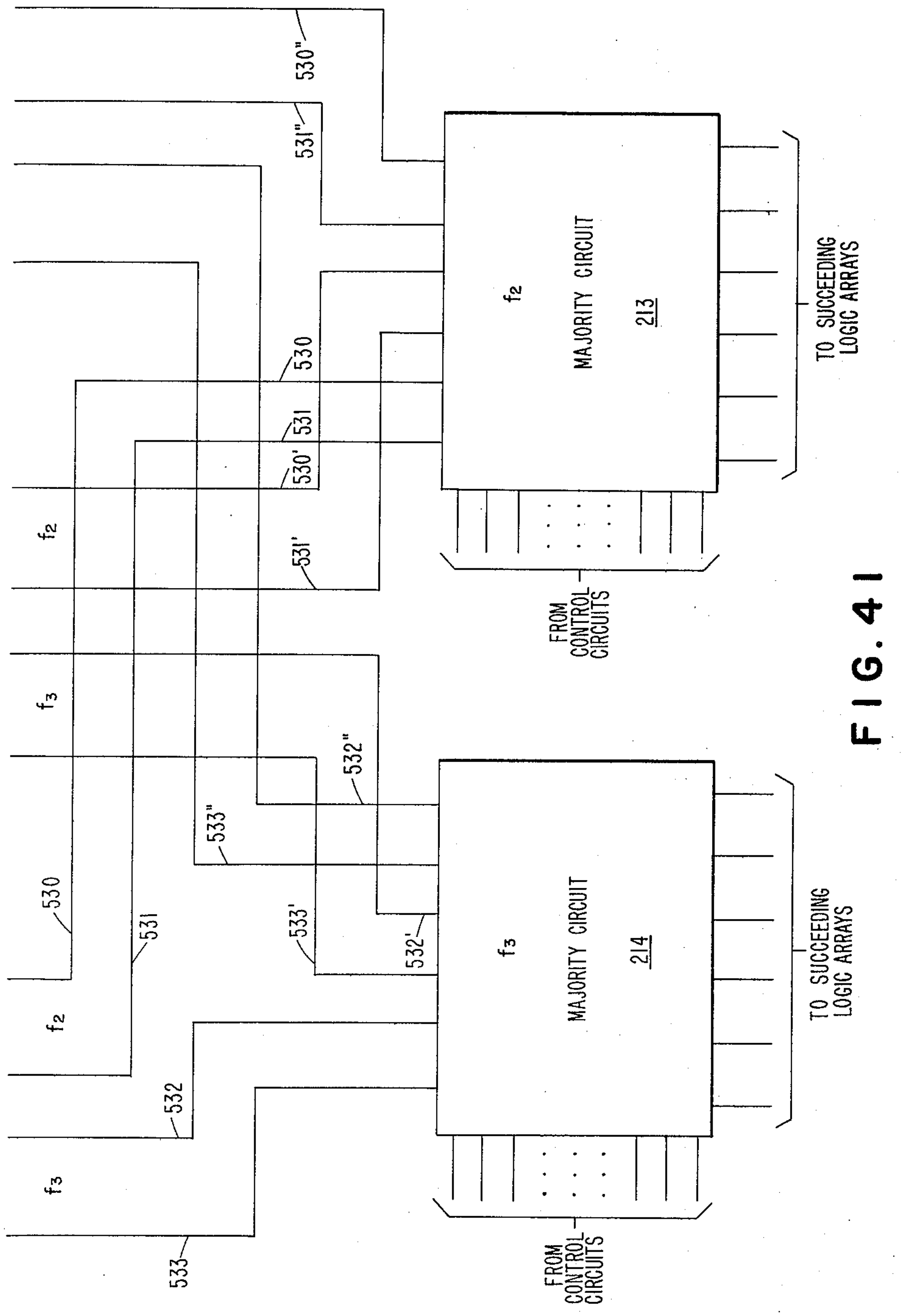

The outputs from bias circuits 189, 191, 193, 201, 203 and 205 are fed along lines 530 and 531, 530′ and 531′, 530″ and 531″, 532 and 533, 532′ and 533′, 532″ and 533″, respectively, to majority circuits 213 and 214, which are shown in block form in FIG. 41. These majority circuits are identical in construction and operation to the majority circuits and controls illustrated in FIGS. 21 through 31. It will be appreciated that the circuitry can be continued utilizing the same principles and constructions set forth.

Now that a portion of a complete system has been described in detail, it will be well to follow through a procedure for backward checking to locate any faulty conditions. This procedure assumes the use of bypass circuits on all stages. A principle of backward checking is that test information always passes through tested and corrected stages, and to insure this, the final stage must be checked first. The first test is made for short circuits between the variable wires and function wires and also for short circuits to ground on the function wires. Assume the last stage has inputs $y_1, y_2 \ldots y_t$, and these inputs are set up by controlling the bypasses on the second last stage. A sequence of tests will be given employing different input combinations on the bypass control wires on the last stage. For purposes of this description reference will be made to the bypass circuit of FIG. 7 and the associated control wires labeled A′, A, B and C. The tests are designed to force the driver current for the function into the variable wire if a short exists, thus forcing an output condition in which no current appears on either the "0" or the "1" output line of the function being tested. The test requires that the function current driver and the variable current driver be different drivers, and also requires that the short circuit be superconductive from function wire to variable wire. The test sequence is as follows:

(1) Set up an input for the function wire to be tested for either the "1" side or the "0" side to be superconductive, and set $A'=A=B=C=1$ (see FIG. 7).

(2) Keeping same input, set $A'=A=C=1$; $B=0$.

Read the output value of the function. If the function has current on the "1" side then no short circuit has been detected. If no current appears on the "1" side output then a short circuit has been detected. This short circuit could be a short to ground or to a variable wire on the function wire under test or one of the other function wires to the left of the first active inhibitor on that wire.

The test is repeated for different input combinations. If no short circuit is detected by any test then there is no superconductive short circuit between the variable and function wires or between the function wires and ground, or else there are also other types of errors. This can be seen from the fact that all crossings for the function wire under test, and any possible short to ground on that function wire are tested by the test sequence which uses an input which makes the function tested wire superconductive.

After correction of the detected short circuits between function wires and either ground or variable wires in the last stage, the variable wires of the last stage are tested for short circuits to ground and for open circuits. A sequence of tests is given below which employs a change of input to the variable wire being tested, as well as a change of signals to the bypass control wires. The test is designed to overcome difficulties arising from current splitting between the "1" and "0" sides of the function causing the output to be either indeterminate or incorrect. The test depends on the property of persistent currents.

At least one of the outputs, say $z_i$, is a function of $y_j$, the input to be tested. This functional dependence can be represented by:

$$z_i = f_i y_j \vee g_i \bar{y}_j \vee p_i$$

where $f_i$, $g_i$ and $p_i$ are functions of $y_1, y_2 \ldots y_{j-1}, y_{j+1} \ldots y_t$, and $f_i \vee g_i \neq 0$, i.e. the function is not equal to zero under all input conditions. Then there must be a set of values $$\hat{y}_1, \hat{y}_2, \ldots \hat{y}_{j-1}, \hat{y}_{j+1} \ldots \hat{y}_t$$

such that a change of $y_j$ from 0 to 1 will cause a change in $z_i$ under correct operation. For definiteness, assume $$f_i(\hat{y}, \hat{y}_2 \ldots \hat{y}_{j-1} \ldots \hat{y}) = 1$$

$$g_i(\hat{y}, \hat{y}_2 \ldots \hat{y}_{i-1}, \hat{y}_{j+1} \ldots \hat{y}_t) = 0$$

and $$p_i(\hat{y}_1, \hat{y}_2 \ldots \hat{y}_{j-1}, \hat{y}_{j+1} \ldots \hat{y}_t) = 0$$

If $f_i \neq 0$, and such a $$(\hat{y}_1, \hat{y}_2 \ldots \hat{y}_{j-1}, \hat{y}_{j+1} \ldots \hat{y}_t)$$

did not exist, then for every input $(y'_1, y'_2 \ldots y'_{j-1}, 1, y'_{j+1} \ldots y'_t)$ to $z_i$ such that $$f_i(y'_1, y'_2 \ldots y'_{j-1}, y'_{j+1} \ldots y'_t) = 1 \text{ either}$$

$$g_i(y'_1, y'_2 \ldots y'_{j-1} y'_{j+1} \ldots y'_t = 1$$

or $$p_i(y'_1, y'_2 \ldots y_{j-1}, y'_{j+1} \ldots y'_t) = 1$$

But this means that $z_i$ could have been reduced further, contradicting the assumption that $z_i$ is in minimum supernormal form. If $f_i \equiv 0$, then the same analysis can be used for $g_i$ to find a testing input $$(\hat{y}_1, \hat{y}_2 \ldots \hat{y}_{j-1}, \hat{y}_{j+1} \ldots \hat{y}_t)$$

To test the variable wires for variable $y_j$, perform the following sequence:

(1) Set up the inputs:

$$y_1 = \hat{y}_1, y_2 = \hat{y} \ldots y_{j-1} = \hat{y}_{j-1}$$

$$y_j = 0, y_{j+1} = \hat{y}_{j+1} \ldots y_t = \hat{y}_t$$

and $$A'=B=C=1; A=0 \text{ (FIGURE 7)}$$

This should force $z_i=0$.

(2) Open the "1" side bypass for $z_i$ by setting $B=0$.

(3) Test the value of $z_i$:

(a) $z_i=0$ means that some "0" side wire is superconducting, (b) $z_i=1$ means that no "0" side wire is superconducting, and thus there must be a defect.

(4) Now set $A'=0$; $A=B=C=1$.

This should force $z_i=1$ if some "1" side wire is superconductive.

(5) Open "0" side bypass by setting $C=0$.

(6) Test the value of $z_i$:

(a) $z_i=0$ means that no "1" side wire is superconducting.

(b) $z_i=1$ means that some "1" side wire is superconducting, and thus there must be a defect.

(7) Set $y_j=1$ and $A'=0$; $A=B=C=1$.

This should force $z_i=1$.

(8) Open "0" side bypass by setting $C=0$.

(9) Test the value of $z_i$:

(a) $z_i=0$ means that no "1" side wire is superconducting, and thus there must be a defect.

(b) $z_i=1$ means that a "1" side wire is superconducting.

(10) Set $A'=1$; $A=0$; $B=C=1$.

This should force $z_i=0$ if some "0" side wire is superconductive.

(11) Open "1" side bypass by setting $B=0$.

(12) Test the value of $z_i$:

(a) $z_i=0$ means that some "0" side wire is superconductive, and thus there must be a defect.

(b) $z_i=1$ means that no "0" side wire is superconductive.

If $z_i=0$ after (3) and (6) and $z_i=1$ after (9) and (12), then the variable wire for $y_j$ has not been found to be defective. If some other condition occurs, then an error has been detected. The possible types of errors which could cause the test result can be listed, and a spare may be switched in for each of these errors and the test repeated. If the test succeeds, when the spare is tried, then the defect has been located and corrected. Another test could also be run on another function, $z_k$, which depends on $y_j$ to further locate the defect and then try switching in spares.

When testing $y_j$'s variable wires, it is best to pick a combination $$\hat{y}_1, \hat{y}_2 \ldots \hat{y}_{j-1}, \hat{y}_{j-1} \ldots \hat{y}_t$$

for which a maximum number of outputs change with a change in $y_j$. Observation of these outputs can then be used to give more detailed information on the location of defects in the stage.

While the above testing procedure applied to each pair of variable wires will detect the presence of open circuits and short circuits to ground, it can only guarantee locating the defect exactly if only one defect has occurred. If two or more defects are present some combination of tests (switching in spares, choosing different input combinations, observing more than one output, using the short circuit test procedure) must be used to determine their exact locations.

A general procedure can be summarized as follows:

(1) Test a single variable wire pair. If it succeeds proceed to the next variable. If the test fails list all cases of single defects that could have caused the result obtained.

(2) Using spares and different input combinations for testing, determine which defect occurred or else, based on the tests thus far, determine which double errors might have occurred.

(3) Using pairs of spares, determine which double defect occurred or else determine the class of possible triple errors, and so on.

Having determined that each variable wire is non-defective, and possibly also that some function wires are also non-defective, the remaining function wires in the last stage are tested. To test a given function wire, say, on the "1" side of $z_1$, an input combination is chosen that is critical for that wire, i.e., an input combination that inhibits all function wires for $z_1$ except the wire being tested. Such an input exists because the use of minimum supernormal form is required to represent $z_1$ and the term corresponding to the wire would not have been used in the minimum representation if such an input did not exist, since the clause would then be redundant.

The bypasses on the second last stage are again used to set up these critical inputs. The last stage bypasses are also used at the last stage itself to overcome the current splitting problem. Consider the bypass arrangement shown in FIG. 7, and perform the following test sequence, assuming that the wire being tested is on the "1" side:

(1) Set up a critical input for the given function wire by using the bypasses of the previous stage. Set $A=A'=B=1$, $C=0$.

(2) Set $A'=0$. Then set $C=1$. This should force $z_1=1$.

(3) Set $C=0$. $z_1=1$ means the given function wire has no open circuit defects. $z_1=0$ means there is a defect present. As with the variable wire test sequence, the validity of this test depends upon persistent currents maintaining flow in the function wire being tested, rather than splitting between this wire and the "0" side bypass. Of course, if the function wire has an open circuit, then current will flow only in the "0" side bypass.

(4) Set $A'=1$. This should force $z_i=0$ and provide a check on the testing circuitry. In this way, each function wire for each $z_i$ is tested, and, if found defective, replaced by a spare.

When the testing of the last stage is completed (i.e. all tests have been completed once with no defects being detected), a test of the second last stage is conducted in a similar manner. Bypasses on the previous stage are used to set up the inputs required. The results of the tests, however, can be observed only at the final outputs, i.e., by observing the $z$'s. Thus to test the variable wire $x_j$ the outputs are observed which depend on $x_j$, such that $$z_i=f_i x_j \vee g_i \bar{x}_j \vee p_i$$

where $f_i \vee g_i \neq 0$.

Similarly, to test a function wire on the "1" side of $y_j$, say, a function $z_k$ is considered such that $$z_k=f_k y_j \vee g_k \bar{y}_j \vee p_k$$

where $f_k \vee g_k \neq 0$. If $f_k \neq 0$, pick a bypass connection for the remaining $y$'s so that $f_k=1$, $g_k=0$, and $p_k=0$. If $f_k \equiv 0$, pick a bypass combination for the remaining $y$'s so that $g=1$, $p=0$. Now to test a given function wire for $y_j$, a critical input $$\hat{x}_1, \hat{x} \ldots \hat{x}_s$$

is selected for that wire and a test procedure similar to that done for a function wire in the last stage is followed. Thus, each stage beginning with the last can thus have its wires tested and corrected for short circuits and open circuits.

While the defects considered so far have been either open or short-circuited wires, another type of defect is also possible. An inhibitor element, e.g., a cryotron, may not operate in the specified manner. Normally, current in the control line will prevent current from flowing in the gate line, and when no current flows in the control line the gate line is superconductive. In a defective cryotron (1) the gate line may be resistive always regardless of the control line current or (2) the gate line may be superconductive always.

In supernormal form circuits the gate line is part of the function wire. If the function wire is always resistive, then the test procedure which detects open circuits on the function wires will also detect the resistive defect. The replacement of this function wire with a spare function wire corrects the circuit.

Now consider cryotron defects of type (2). Consider a function wire A of a minimum supernormal form circuit for a function $f$. Let $f$ have variables $y_1, y_2 \ldots y_t$, and let $y_i$ have a cryotron on the "0" side at wire A. For some input $$\hat{y}=\hat{y}_1 \ldots \hat{y}_{i-1}, \hat{y}_{i-1} \ldots \hat{y}_t$$

and $y_i=1$ the wire A is superconductive and when $y_i$ is changed to "0," A becomes resistive and the functional value changes. If no such $\hat{y}$ existed when the cryotron on the "0" side of $y_i$ at A would not be required, contradicting the assumption that the circuit was designed in minimum supernormal form.

By applying input $\hat{y}$ and using the test procedure for variable wires the function will change value for a change in $y_i$ under correct operation. If the functional value does not change a defect is detected. This defect could be a defective variable wire or the cryotron always being superconductive. If a defect is detected, replacing the variable wire with a spare wire corrects the circuit.

Another test procedure for open circuit defects in variable wires may be employed. This test may be employed where either bypass or bias circuits are utilized. In testing the variable wires, a choice of all of the variable inputs except one is made. When all of the other variables have been set to a given condition, the remaining input variable is set first to "0" and then to "1," comparing outputs for the two cases. If some output changes for this change in the given input variable, then that variable's wires have no open circuits. If no output changes for the change in the given variable, another choice for the remaining variables must be made and the two outputs for the given variable again compared. If for all possible choices of the remaining variables, a change in the given variable does not affect any output, it is assumed that the given variable has an open circuit conditon and must be replaced. This procedure is carried out in turn for each of the variable wires. During the variable testing operation defects can be tolerated in the function wires since the only indication needed is a change on some one of the outputs in order to determine whether or not a given variable is defective.

Since the detail showing in FIGS. 21 to 41 is an intermediate portion of a complete system, let be assumed that logic array 183 constitutes the final stage of the system and that the outputs may be observed on lines 530 to 533. The functions realized in array 183 are $$f_2=\bar{c}d\vee c\bar{d},\ \bar{f}_2=cd\vee\overline{cd},\ \bar{f}_3=\bar{c}d,\ \text{and}\ \bar{f}_3=\bar{f}_3=c\vee\bar{d}$$

The "*d*" variable input lines 436 and 437 to array 183 are controlled by bypass circuits 439, and any desired condition can be set up on these lines. It is assumed that the "*c*" variable input to lines 470 and 471 is also controllable to set up any desired input condition. The bypass circuit 439 is employed by applying currents from the control circuitry 157 to control lines 452 and 453 to activate inhibitors 494 to 497. In this manner flip-flops 464 and 465 are forced to their "1" condition to activate lines 458 and 459, which in turn activate inhibitors 445 and 446 to bias off output lines 436 and 437.

With output lines 436 and 437 removed from control of the majority circuit 175, bypass lines 432 to 435, under control of inhibitors 440 to 443 and 448 to 451, may be selectively energized to produce a current in either of lines 436 or 437. Appropriate program signals for this sequence are supplied from control computer 159 through control circuitry 157.

The sequence for the programing of array 183 is shown in Table II below:

*Table II*

| Variable | | Function | |
|---|---|---|---|
| *c* | *d* | $f_2$ | $f_3$ |
| 0 | 0 | 0 | 0 |
| 0 | 1 | 1 | 1 |
| 1 | 0 | 1 | 0 |
| 1 | 1 | 0 | 0 |

Should any of the input combinations listed fail to yield the output function value, a defect exists in array 183 and must be corrected. If all combinations produce the correct result then no defects are present. When array 183 is checked and corrected, if necessary, the procedure is repeated in order through majority circuit 175 and logic array 151.

For purposes of this discussion let be assumed that a break is present in line 470 of array 183. The "*d*" variable wires are arbitrarily selected first for test. The value $c=0$ is selected, which means that line 471 will be energized, and the "*d*" variable wires are sequenced first energizing line 437 and then line 436. When line 437 is energized an output is obtained along line 480 giving a "1" indication. When line 436 is energized, line 480 is inhibited but line 476 is open and the circuit output switches to a "0" indication. This change in output indicates that the "*d*" variable wires 437 and 436 are not defective.

The "*c*" variable wires 470 and 471 are next tested. A value $d=1$ is chosen, which means that line 437 will be energized. Line 471 is energized and an output along line 480 is obtained to give a "1" indication. When the "*c*" variable is switched to energize line 470, there is no current established since the break is in this line. Line 480 continues to remain superconductive and a "1" output along this line continues to indicate the function value although line 478 is not inhibited. Line 478 does not cause a split of the current from the driver terminal because an applied superconductive current will not change its established course apart from some positive switching action. Since the output remained a "1" for both values of the variable "*c*," it is necessary to choose the value $d=0$ and repeat the sequence. For $d=0$, $c=0$ a "0" output is obtained along line 476. For $d=0$, $c=1$, the "0" output along line 476 continues although line 479 is now unblocked. Since no change in output was obtained for all possible sequencing of the "*c*" variable wires, it must be assumed that one of these wires is defective.

Spare wire 472 is then substituted for either line 470 or 471 and the testing procedure is repeated. Assuming that there are no defects in spare 472, if this spare is substituted for line 471 the test will still indicate a defect. The spare is then substituted for wire 470, and this time the test will indicae that the defective component has been replaced.

In all of the test procedures described herein for checking the variable and function wires in each stage, the test is applied first to the final stage and then to all preceding stages in order until the initial stage is reached. Defective components are replaced when they are located, and when the procedure is completed the system will be free from defects. In this manner it is not necessary to remove any of the plates from the refrigerant bath unless all of the spare wires on that plate are also found to be defective or are used up during the test operation. The use of redundant stages and majority circuits minimizes the possibilities of errors affecting the system output.

It will be appreciated that the principles described in connection with the arrangement shown can be extended to various other embodiments without departing from the invention as set forth in the claims.

What is claimed is:

1. In a data handling system employing rectangular array inhibitor logic the combination comprising a plurality of serially-connected stages each having an input and an output and being capable of performing logical operations upon input data, bypass means connecting the input and output of at least one of said stages, and means controlling said bypass means for producing any desired output condition at the output of said stage.

2. The combination according to claim 1 wherein said controlling means comprises means for inhibiting the ordinary output of said stage and selectively switching said bypass means to force a desired output.

3. In a data handling system employing rectangular array inhibitor logic the combination comprising a plurality of serially-connected stages each having an input and an output and being capable of performing logical operations upon input data, inhibitor logic means connected to the output of at least one of said stages for forcing the output to assume any desired output condition, and means controlling said inhibitor logic means for producing said desired output condition.

4. The combination according to claim 3 wherein said stage has a pair of output lines and said controlling means includes means for inhibiting selectively said output lines and for transferring the signal present on one output line to the other output line.

References Cited by the Examiner

UNITED STATES PATENTS

| | | | |
|---|---|---|---|
| 2,910,584 | 10/1959 | Steele | 328—92 |
| 2,933,618 | 4/1960 | Buck | 340—147 |
| 2,942,193 | 6/1960 | Tryon | 340—147 |
| 2,977,534 | 3/1961 | Hermansdorfer et al. | 324—73 |
| 2,977,575 | 3/1961 | Hagelbarger | 307—88 XR |

| | | | |
|---|---|---|---|
| 3,004,705 | 10/1961 | Bremer | 340—147 |
| 3,029,495 | 4/1962 | Doctor | 317—101 |

FOREIGN PATENTS

| | | |
|---|---|---|
| 1,205,568 | 8/1959 | France. |

OTHER REFERENCES

"Rectifier Networks," by Brown et al., pp. 139–147, Proc. of I.R.E., Feb. 1949.

"Mandl's Television Servicing" by M. Mandl, The MacMillan Co., 1952, pp. 36–37.

NEIL C. READ, *Primary Examiner.*

IRVING SRAGOW, *Examiner.*